United States Patent
Woo

(10) Patent No.: US 10,254,583 B2
(45) Date of Patent: Apr. 9, 2019

(54) CURVED DISPLAY DEVICE

(71) Applicant: Samsung Display Co., Ltd., Yongin, Gyeonggi-Do (KR)

(72) Inventor: Hwa Sung Woo, Asan-si (KR)

(73) Assignee: Samsung Display Co., Ltd. (KR)

(*) Notice: Subject to any disclaimer, the term of this patent is extended or adjusted under 35 U.S.C. 154(b) by 318 days.

(21) Appl. No.: 14/802,514

(22) Filed: Jul. 17, 2015

(65) Prior Publication Data

US 2016/0131945 A1    May 12, 2016

(30) Foreign Application Priority Data

Nov. 11, 2014  (KR) .................. 10-2014-0156212

(51) Int. Cl.
| | |
|---|---|
| *G02F 1/1335* | (2006.01) |
| *G02F 1/1368* | (2006.01) |
| *G02F 1/1362* | (2006.01) |
| G02F 1/1343 | (2006.01) |
| G02F 1/1333 | (2006.01) |

(52) U.S. Cl.
CPC ...... *G02F 1/133536* (2013.01); *G02F 1/1368* (2013.01); *G02F 1/133528* (2013.01); *G02F 1/136209* (2013.01); *G02F 1/133305* (2013.01); *G02F 2001/133565* (2013.01); *G02F 2001/134345* (2013.01)

(58) Field of Classification Search
CPC ................... G02F 1/133536; G02F 1/133528
See application file for complete search history.

(56) References Cited

U.S. PATENT DOCUMENTS 4,526,818 A * 7/1985 Hoshikawa ....... G02F 1/133305
156/106
5,307,190 A * 4/1994 Wakita ............. G02F 1/133305
349/153

(Continued)

FOREIGN PATENT DOCUMENTS

EP         2749931 A1     7/2014
JP      2009-092998       4/2009

(Continued)

OTHER PUBLICATIONS

European Patent Office, European Search Report corresponding to European Application No. EP15179760, dated Sep. 1, 2015, 3 pages, Munich, Germany.

*Primary Examiner* — Sang V Nguyen
(74) *Attorney, Agent, or Firm* — Innovation Counsel LLP

(57) ABSTRACT

A curved display device comprises: a first substrate and a second substrate facing each other and having a curvature; a liquid crystal layer between the first and second substrates; a first polarizing layer between the liquid crystal layer and a first surface of the first substrate that faces the liquid crystal layer, or positioned to face a second surface of the first substrate opposite to the first surface of the first substrate; and a second polarizing layer between the liquid crystal layer and a first surface of the second substrate that faces the liquid crystal layer, or positioned to face a second surface of the second substrate opposite to the first surface of the second substrate; wherein at least one of the first and second polarizing layers is either between the first substrate and the liquid crystal layer or between the second substrate and the liquid crystal layer.

13 Claims, 18 Drawing Sheets

(56) References Cited

U.S. PATENT DOCUMENTS

| | | | | |
|---|---|---|---|---|
| 9,634,040 B2* | 4/2017 | Guo | | H01L 27/1255 |
| 2003/0082889 A1* | 5/2003 | Maruyama | | H01L 27/1214 |
| | | | | 438/455 |
| 2004/0109106 A1* | 6/2004 | Yang | | G02F 1/133528 |
| | | | | 349/69 |
| 2007/0165170 A1* | 7/2007 | Fukuda | | G02F 1/1333 |
| | | | | 349/138 |
| 2007/0279560 A1* | 12/2007 | Ishitani | | G02F 1/133502 |
| | | | | 349/116 |
| 2009/0161048 A1 | 6/2009 | Satake et al. | | |
| 2010/0066964 A1* | 3/2010 | Takatori | | G02F 1/133707 |
| | | | | 349/139 |
| 2010/0123845 A1* | 5/2010 | Kim | | H01L 27/124 |
| | | | | 349/46 |
| 2011/0019129 A1* | 1/2011 | Nishizawa | | G02F 1/133308 |
| | | | | 349/64 |
| 2011/0299025 A1* | 12/2011 | Sahouani | | A61F 9/067 |
| | | | | 349/194 |
| 2012/0050075 A1* | 3/2012 | Salmon | | G06F 1/1626 |
| | | | | 341/20 |
| 2012/0069272 A1* | 3/2012 | Sugita | | G02B 5/0257 |
| | | | | 349/64 |
| 2012/0229754 A1* | 9/2012 | Iyer | | G02C 7/083 |
| | | | | 351/159.4 |
| 2012/0287506 A1* | 11/2012 | Yao | | G02B 5/201 |
| | | | | 359/491.01 |
| 2012/0293736 A1 | 11/2012 | Jung et al. | | |
| 2013/0329444 A1* | 12/2013 | Oh | | F21V 21/00 |
| | | | | 362/543 |
| 2014/0078450 A1* | 3/2014 | Yang | | G02F 1/13363 |
| | | | | 349/96 |
| 2014/0092350 A1* | 4/2014 | Byeon | | G02F 1/1339 |
| | | | | 349/106 |
| 2014/0118656 A1* | 5/2014 | Jang | | G02F 1/133528 |
| | | | | 349/44 |
| 2014/0176856 A1* | 6/2014 | Lee | | G02F 1/133305 |
| | | | | 349/61 |
| 2014/0254011 A1 | 9/2014 | McCarthy et al. | | |
| 2015/0028296 A1* | 1/2015 | Jeong | | H01L 51/5281 |
| | | | | 257/40 |
| 2015/0168754 A1* | 6/2015 | Im | | G02F 1/1339 |
| | | | | 349/85 |
| 2015/0168792 A1* | 6/2015 | Woo | | G02F 1/1333 |
| | | | | 349/110 |
| 2015/0168793 A1* | 6/2015 | Oh | | G02F 1/133707 |
| | | | | 349/110 |
| 2015/0198833 A1* | 7/2015 | Chung | | G02B 5/3058 |
| | | | | 349/67 |
| 2015/0234235 A1* | 8/2015 | Park | | G02F 1/133707 |
| | | | | 349/33 |
| 2016/0170261 A1* | 6/2016 | Nam | | G02F 1/133528 |
| | | | | 257/72 |
| 2016/0342259 A1* | 11/2016 | Xiong | | G02F 1/1333 |

FOREIGN PATENT DOCUMENTS

| | | |
|---|---|---|
| JP | 2010-097028 A | 4/2010 |
| KR | 10-1994-0011991 A | 6/1994 |
| KR | 10-2005-0040720 A | 5/2005 |
| KR | 10-2014-0007202 A | 1/2014 |
| WO | 8502914 A1 | 7/1985 |
| WO | 2010096310 A2 | 8/2010 |

* cited by examiner

CURVED DISPLAY DEVICE

CROSS-REFERENCE TO RELATED APPLICATIONS

This application is based on, and claims priority from, Korean Patent Application No. 10-2014-0156212 filed on Nov. 11, 2014 in the Korean Intellectual Property Office, the disclosure of which is incorporated herein in its entirety by reference.

BACKGROUND

1. Field of the Invention

Embodiments of the present invention relate generally to flat panel displays. More specifically, embodiments of the present invention relate to curved display devices.

2. Description of the Prior Art

A liquid crystal display is one example of display devices that have seen wide acceptance. The liquid crystal display functions by controlling the quantity of light that penetrates a liquid crystal layer interposed between electrodes (i.e., a pixel electrode and a common electrode) formed on two substrates that face each other. This is accomplished by controlling orientations of liquid crystal molecules of the liquid crystal layer through applying of voltages to the electrodes.

In a liquid crystal display, a liquid crystal panel is composed of elements that are not self-luminous, and thus a backlight unit for supplying light to the liquid crystal panel is required. Further, polarizing plates having permeation axes that are orthogonal to each other are attached to outsides of the substrates of the liquid crystal panel.

SUMMARY

It is sometimes desirable to fabricate curved liquid crystal displays. For example, curved displays may provide a panoramic effect for the viewer, heightening the immersive experience.

As an example, a curved display device may be manufactured through fastening of a flat liquid crystal panel to a backlight unit having a curvature. However, in the process of fastening the liquid crystal panel to the backlight unit, stress may occur in the liquid crystal panel. In particular, stress occurs in portions of substrates of the liquid crystal panel which are bent to conform to the curvature of the backlight unit, resulting in liquid crystal panel substrates that exhibit optical anisotropy. Due to this, unwanted light may permeate a polarizing plate to cause unwanted images to be displayed on the curved display device. In particular, in the case of displaying a black image on the curved display device, a light leakage phenomenon may occur, resulting in detrimental visual effects such as black blurring.

Accordingly, one subject to be solved by the present invention is to provide a curved display device which can reduce a display of unwanted images resulting from stress induced in the display substrates.

Additional advantages, subjects, and features of the invention will be set forth in part in the description which follows and in part will become apparent to those having ordinary skill in the art upon examination of the following or may be learned from practice of the invention.

In one aspect of the present invention, there is provided a curved display device comprising: a first substrate and a second substrate facing each other and having a curvature; a liquid crystal layer arranged between the first substrate and the second substrate; a first polarizing layer arranged between the liquid crystal layer and a first surface of the first substrate that faces the liquid crystal layer, or positioned to face a second surface of the first substrate, the second surface of the first substrate being opposite to the first surface of the first substrate; and a second polarizing layer arranged between the liquid crystal layer and a first surface of the second substrate that faces the liquid crystal layer, or positioned to face a second surface of the second substrate, the second surface of the second substrate being opposite to the first surface of the second substrate. At least one of the first polarizing layer and the second polarizing layer is arranged either between the first substrate and the liquid crystal layer or between the second substrate and the liquid crystal layer.

A thickness of the first substrate may be equal to a thickness of the second substrate.

The first polarizing layer may be arranged between the first substrate and the liquid crystal layer, and the second polarizing layer may be arranged to face the second surface of the second substrate.

The first polarizing layer may be positioned to face the second surface of the first substrate, and the second polarizing layer may be arranged between the second substrate and the liquid crystal layer.

The first polarizing layer may be arranged between the first substrate and the liquid crystal layer, and the second polarizing layer may be arranged between the second substrate and the liquid crystal layer.

A thickness of the first substrate may be thinner than a thickness of the second substrate.

The first polarizing layer may be arranged to face the second surface of the first substrate, and the second polarizing layer may be arranged between the second substrate and the liquid crystal layer.

A thickness of the second substrate may be thinner than a thickness of the first substrate.

The first polarizing layer may be arranged between the first substrate and the liquid crystal layer, and the second polarizing layer may be arranged to face the second surface of the second substrate.

The first polarizing layer may be arranged between the first substrate and the liquid crystal layer and may come in direct contact with the first substrate.

The curved display may further comprise thin film transistors arranged between the first polarizing layer and the liquid crystal layer, wherein the first polarizing layer may be arranged between the first substrate and the thin film transistors.

The second polarizing layer may be arranged between the second substrate and the liquid crystal layer and may come in direct contact with the second substrate.

The first polarizing layer may be formed to have a first optical axis, and the second polarizing layer may be formed to have a second optical axis that is substantially perpendicular to the first optical axis.

The curved display device may further comprise a backlight unit arranged on a lower portion of the first substrate to supply light.

The first substrate may comprise a display area in which an image is to be displayed and in which a plurality of pixels are defined, as well as a non-display area positioned proximate to least one side of the display area.

The first polarizing layer may be an absorption type polarizing layer, and the second polarizing layer may be an absorption type polarizing layer, and the first polarizing layer and the second polarizing layer may be arranged over substantially an entire surface of the first substrate or may be arranged to overlap at least the display area of the first substrate.

The curved display device may further comprise a first electrode arranged in a pixel of the first substrate and arranged between the first polarizing layer and the liquid crystal layer, wherein the first polarizing layer is a reflection type polarizing layer, and the second polarizing layer is an absorption type polarizing layer, and the first polarizing layer may include a plurality of metal lines which are arranged over substantially the entire first substrate, arranged to overlap the display area of the first substrate, or arranged to overlap the first electrode of the first substrate.

The curved display device may further comprise a first electrode arranged in a pixel of the first substrate and arranged between the first polarizing layer and the liquid crystal layer, wherein the first polarizing layer may be an absorption type polarizing layer, and the second polarizing layer may be a reflection type polarizing layer, and the second polarizing layer may include a plurality of metal lines which are arranged on the second substrate to overlap the first electrode.

The curved display device may further comprise: thin film transistors arranged between the first polarizing layer and the first electrode; and a black matrix arranged on the second substrate so as to overlap the thin film transistors, wherein the first electrode may include a first sub-electrode and a second sub-electrode arranged so that the thin film transistors are interposed between the first sub-electrode and the second sub-electrode, and the second polarizing layer may be positioned at a same level as the level of the black matrix.

The curved display device may further comprise a first electrode arranged in a pixel of the first substrate and arranged between the first polarizing layer and the liquid crystal layer, wherein the first polarizing layer may be a reflection type polarizing layer, and the second polarizing layer may be a reflection type polarizing layer, the first polarizing layer may include a plurality of metal lines which are arranged over substantially the entire first substrate, arranged to overlap the display area on the first substrate, or arranged to overlap the first electrode on the first substrate, and the second polarizing layer may include a plurality of metal lines arranged to overlap the first electrode.

According to embodiments of the present invention, at least the following effects can be achieved.

According to the curved display device according to an embodiment of the present invention, at least one of the first polarizing layer and the second polarizing layer is arranged inside the display panel, preventing undesired visual effects caused by optical anisotropy in the display substrates due to stress caused by their attachment to a curved display device.

The effects according to the present invention are not limited to the contents as exemplified above, but further various effects are included in the description.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

It will also be understood that when a layer is referred to as being "on" another layer or substrate, it can be directly on the other layer or substrate, or intervening layers may also be present. The same reference numbers indicate the same components throughout the specification. The various Figures are not to scale.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Hereinafter, embodiments of the present invention will be described with reference to the accompanying drawings.

Figure 1:
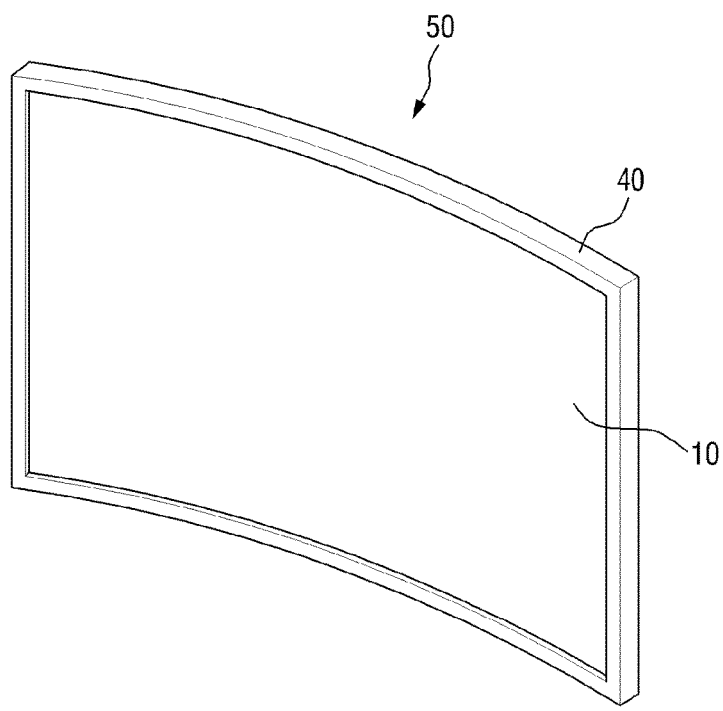
FIG. 1 is a perspective view of a curved display device in an assembled state according to an embodiment of the present invention.
Figure 2:
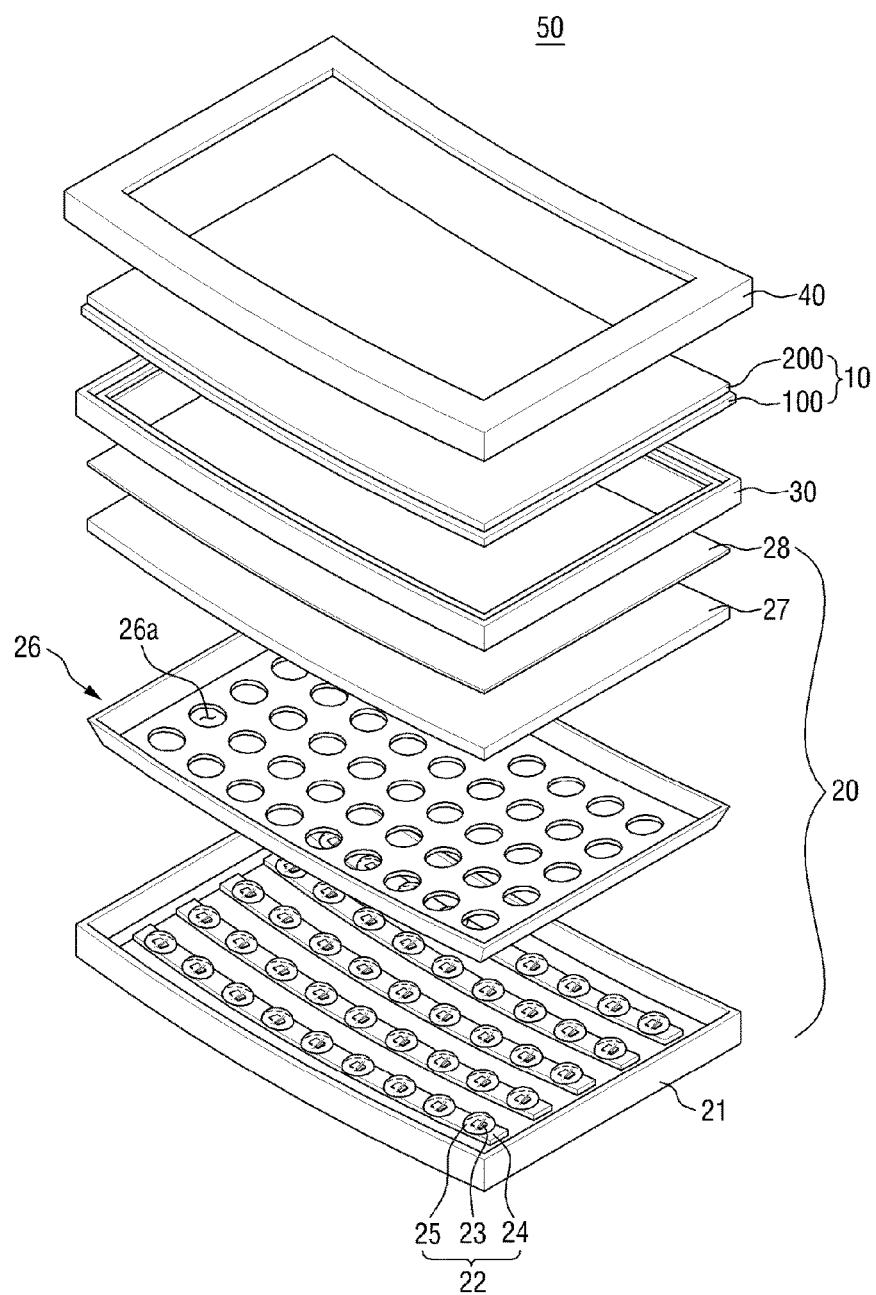
FIG. 2 is a perspective view of the curve display device of FIG. 1 in a separated state.

FIG. 1 is a perspective view of a curved display device in an assembled state according to an embodiment of the present invention. FIG. 2 is a perspective view of the curve display device of FIG. 1 in a separated state, and FIG. 3 is a schematic layout diagram of a display panel of FIG. 2.

Figure 3:
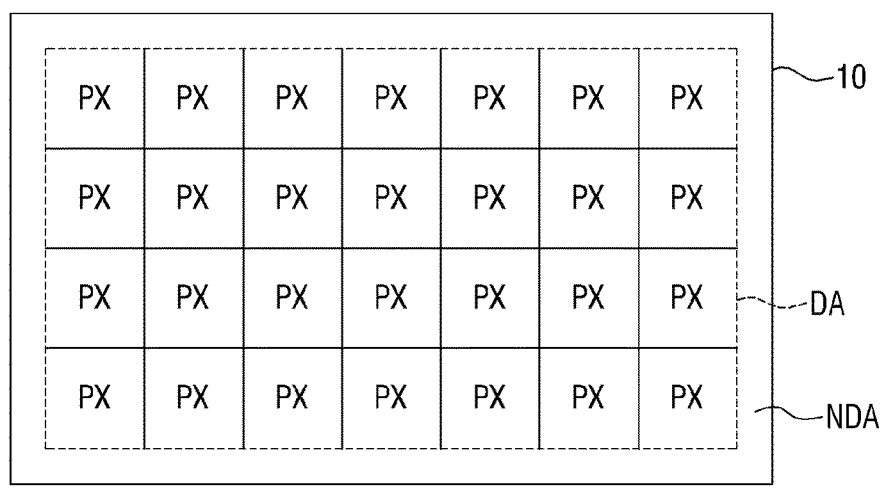
FIG. 3 is a schematic layout diagram of a display panel of FIG. 2.

Referring to FIGS. 1 to 3, at least part of a curved display device 50 may have a curvature. The device 50 may include a display panel 10, a backlight unit 20, a middle receptacle 30, and an upper receptacle 40 which have a shape that corresponds to the curvature.

The display panel 10 is to display an image, and may include a first display plate 100 and a second display plate 200 that face each other. The first display plate 100 and the second display plate 200 may be bonded together by a sealant (not illustrated) in known manner. A liquid crystal layer LC (in FIG. 5) may be interposed between the first display plate 100 and the second display plate 200.

Each of the first display plate 100 and the second display plate 200 of the display panel 10 includes a display area DA in which an image is displayed, and a non-display area NDA that is positioned on at least one side of the display area DA. A plurality of pixels PX that are arranged in a matrix form may be defined in the display area DA. Each pixel PX may include a pixel area PA (in FIG. 6) in which a first electrode PE (in FIG. 6) is formed, and a non-pixel area NPA (in FIG. 6) that is the area of pixel PX outside the pixel area PA (in FIG. 6). A gate pad GP (in FIG. 4) and a data pad DP (in FIG. 4) may be formed in the non-display area NDA. Although FIG. 3 illustrates that the non-display area NDA is formed to correspond to four sides of the display panel 10 in the form of the area surrounding the display area DA, the non-display area NDA may be formed to correspond to less than four sides.

The backlight unit 20 provides light to the display panel 10, and may include a lower receptacle 21, one or more light source modules 22, a reflective sheet 26, an optical plate 27, and an optical sheet 28.

The lower receptacle 21 accommodates the light source modules 22, the reflective sheet 26, the optical plate 27, and the optical sheet 28. The lower receptacle 21 may be a bottom chassis. The lower receptacle 21 may include a recessed portion (not illustrated) in which the light source modules 22 are arranged.

Each light source module 22 may include a plurality of light sources 23, for example LED (Light Emitting Diode) light sources, that generate light to be provided to the display panel 10, a printed circuit board 24 that provides power for driving the plurality of light sources 23, and optical lenses 25 that diffuse the light emitted from the plurality of light sources 23.

The reflective sheet 26 serves to reflect light that is directed downward, back upward toward the display panel 10. The reflective sheet 26 may be a single unitary and continuous sheet, or may have holes or cutouts for each light source 23. In particular, the reflective sheet 26 may include openings 26a corresponding in number to the number of light sources 23.

The optical plate 27 and the optical sheet 28 are optical modulation structures arranged on an upper portion of the light source module 22 to modulate the light from light sources 23. In an exemplary embodiment, the optical plate 27 may be a diffusion plate. The optical sheet 28 may be, for example, a prism sheet, a diffusion sheet, a micro lens sheet, a lenticular sheet, a phase difference compensation sheet, a reflective polarizing sheet, or the like. Any number and combination of such sheets is contemplated.

The middle receptacle 30 is arranged on an upper portion of the optical sheet 28, and may be, for example, a mold frame or a middle mold. The middle receptacle 30 may be fixed to or fastened to the lower receptacle 21. The middle receptacle 30 may accommodate the display panel 10, the optical plate 27, and the optical sheet 28.

The upper receptacle 40 is arranged on an upper portion of the display panel 10, and may be a top chassis or a bezel. The upper receptacle includes an open or transparent window, and covers an edge of the display panel 10. The upper receptacle 40 may be bonded to the lower receptacle 21.

Hereinafter, the display panel 10 will be described in more detail. The configuration of the display panel 10 will be described with reference to one pixel PX.

Figure 4:
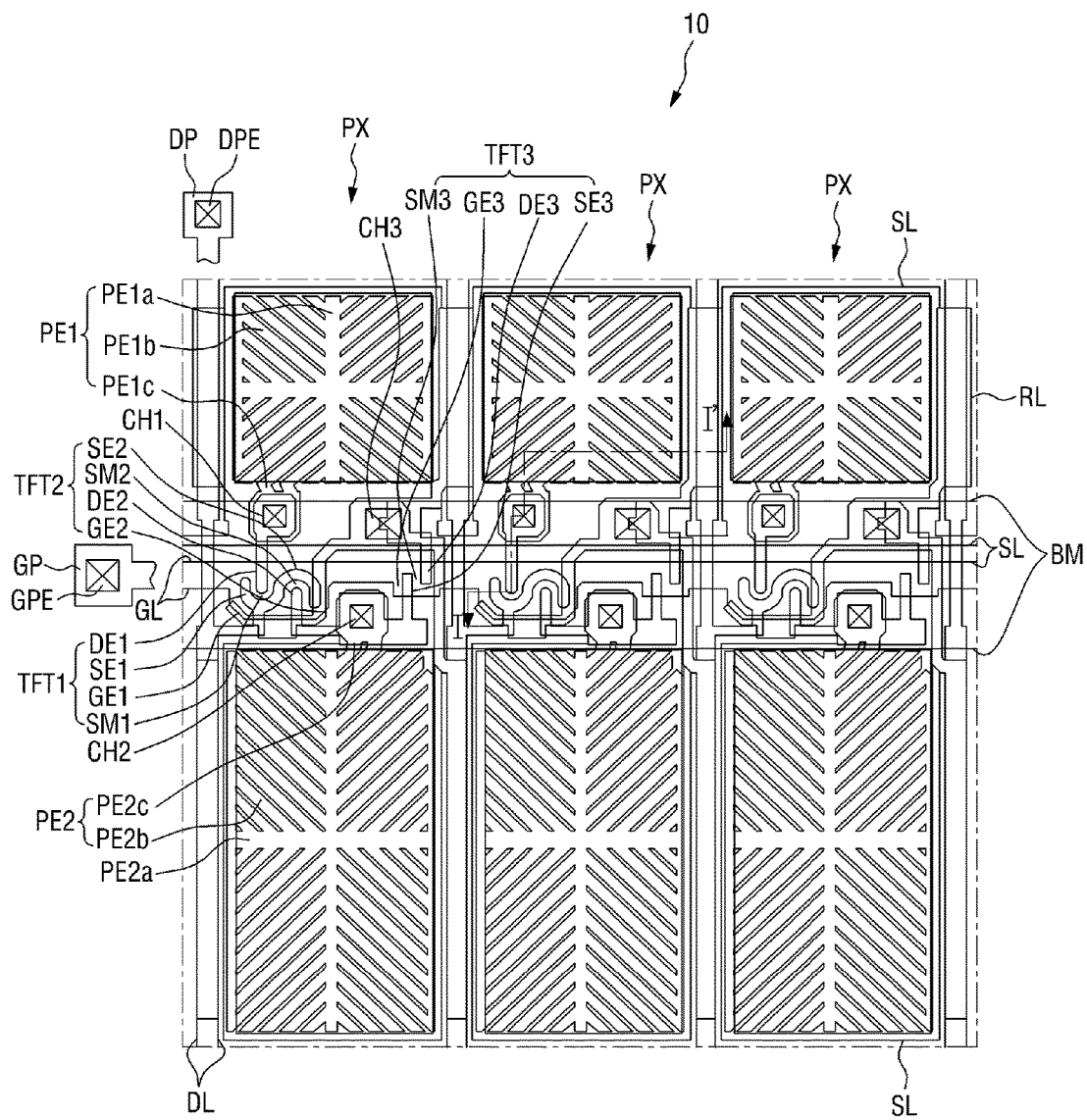
FIG. 4 is a plan view of three pixels explaining a display panel of FIG. 2.
Figure 5:
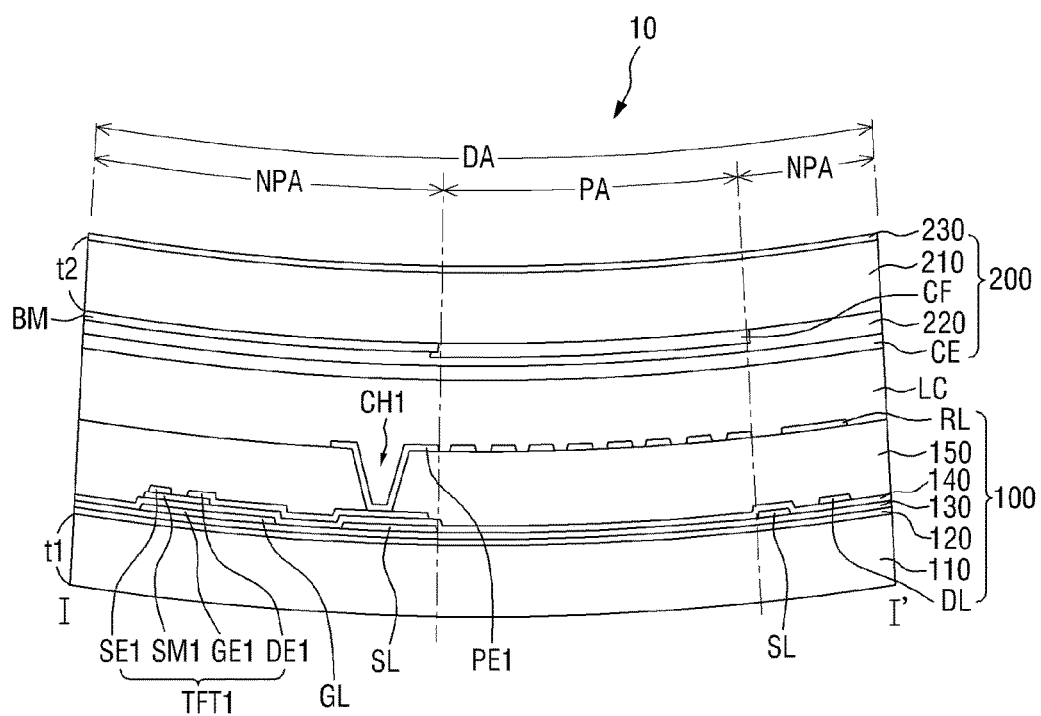
FIG. 5 is a cross-sectional view of the display panel of FIG. 4, the cross-section taken along line I-I' of FIG. 4.
Figure 6:
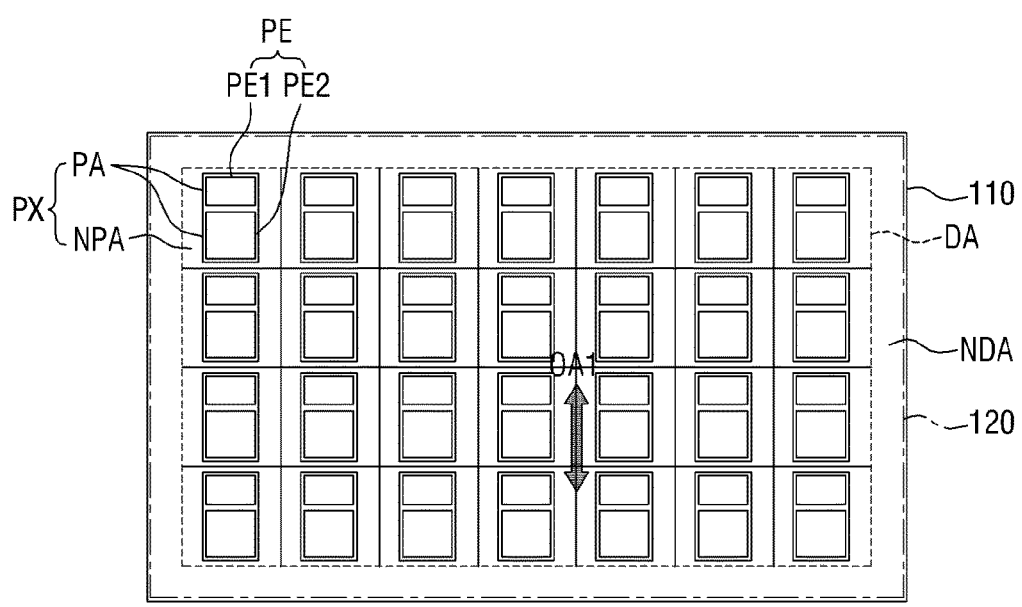
FIG. 6 is a layout diagram illustrating an arrangement of a first polarizing layer on a first substrate of a display panel of FIG. 2.
Figure 7:
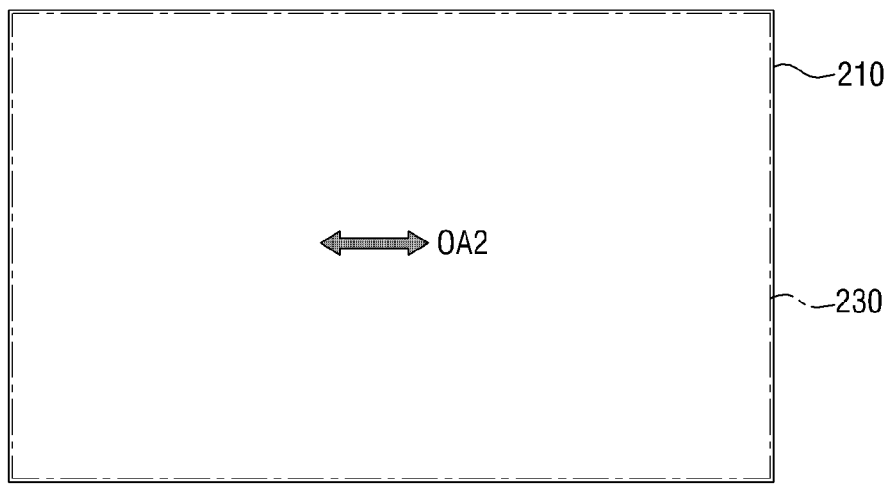
FIG. 7 is a layout diagram illustrating an arrangement of a second polarizing layer on a second substrate of a display panel of FIG. 2.

FIG. 4 is a plan view of three pixels of a display panel of FIG. 2, and FIG. 5 is a cross-sectional view of the display panel of FIG. 4 taken along line I-I' of FIG. 4. FIG. 6 is a layout diagram illustrating an arrangement of a first polarizing layer on a first substrate of a display panel of FIG. 2, and FIG. 7 is a layout diagram illustrating an arrangement of a second polarizing layer on a second substrate of a display panel of FIG. 2.

Referring to FIGS. 4 and 5, the first display plate 100 of the display panel 10 includes a first substrate 110, a first polarizing layer 120, a first insulating layer 130, a gate line GL, a data line DL, a storage line SL, a reference line RL, a gate insulating layer 140, a first thin film transistor TFT1, a second thin film transistor TFT2, a third thin film transistor TFT3, a protection layer 150, and a first electrode (which may in some embodiments be referred to as a pixel electrode) PE (the combination of PE1 and PE2).

The first substrate 110 has a curvature at least partly conforming to the shape of the curved display device 50, and may include a display area DA and a non-display area NDA. The first substrate 110 may include a material having superior permeability to light, heat resistance, and chemical resistance. For example, the first substrate 110 may include any one of glass, polyethylenenaphthalate, polyethyleneterephthalate, and polyacryl, which have superior light permeability. The first substrate 110 may have a first thickness t1. Since the flat display panel 10 is fastened to a backlight unit 20 that has a curvature, the first substrate 110 may be subjected to a first stress during the process of manufacturing the curved display device 50.

The first polarizing layer 120 is formed between the first substrate 110 and the liquid crystal layer LC. For example, the first polarizing layer 120 may be formed between the first substrate 110 and the thin film transistors TFT1, TFT2, and TFT3. That is, the first polarizing layer 120 is formed on the first substrate 110 prior to other structures including the thin film transistors TFT1, TFT2, and TFT3, and thus may not be affected by high temperature that is applied to form these other structures. Further, the first polarizing layer 120 may be arranged directly on the first substrate 110, and may be easily deposited on and attached to the flat upper surface of the first substrate 110. FIG. 6 illustrates that the first polarizing layer 120 is arranged on, and covers, substantially the entire first substrate 110, but the embodiments are not limited thereto. In some embodiments, the first polarizing layer 120 may be arranged to correspond only to the display area DA.

The first polarizing layer 120 polarizes interior light, provided from the backlight unit 20, in a specific direction. For example, the first polarizing layer 120 is formed to have an optical axis OA1 (in FIG. 6) of 0°, and thus polarizes the internal light along an axis oriented at 0°. The first polarizing layer 120 polarizes the internal light that has already passed through the first substrate 110. Accordingly, even if phase retardation of the internal light occurs due to an optical anisotropy phenomenon that occurs on the first substrate 110, the first polarizing layer 120 polarizes the internal light after any such phase retardation has already occurred, so that the light provided to the liquid crystal layer LC is polarized even if it is phase-retarded. Optical anisotropy may be generated by the stress induced in the first substrate 110 by the process of manufacturing a curved display device 50, typically through fastening of the flat display panel 10 to the curved backlight unit 20. That is, when the flat display panel 10 is fastened to a backlight unit 20 having curvature, the first stress occurs in portions of the first substrate 110 which are bent to conform to the curvature of the backlight unit 20 and portions of the first substrate 110 corresponding to the fastening points of the display panel 10 and the backlight unit 20, resulting in the first substrate 110 that exhibits optical anisotropy.

On the other hand, if the first polarizing layer 120 is arranged outside the first substrate 110, the polarization characteristic of the light that is provided to the liquid crystal layer LC may differ from the polarization characteristic of the internal light that is polarized by the first polarizing layer 120. This is because phase retardation may occur in internal light that is first polarized by the first polarizing layer 120 and then passes through an optically anisotropic first substrate 110.

The first polarizing layer 120 may be an absorption type polarizing layer that absorbs light that is not oriented in the specific direction, or a reflection type polarizing layer that reflects light that is nor oriented in the specific direction. The absorption type polarizing layer may be formed by, for example, dyeing iodine or dichroic dyes to a stretched polyvinyl alcohol film. The reflection type polarizing layer may be formed by, for example, patterning a conductive material, and may be formed as a wire grid polarization pattern. FIGS. 5 and 6 illustrate a case where the first polarizing layer 120 is implemented as an absorption type polarizing layer.

The first insulating layer 130 is arranged on the first polarizing layer 120. The first insulating layer 130 may serve to planarize and protect the first polarizing layer 120. The first insulating layer 130 may include, as an example, silicon oxide (SiOx). The first insulating layer 130 may be omitted.

The gate line GL is formed on the first substrate 110, and specifically is formed to extend generally in the first direction on the first insulating layer 130, and acts to transfer a gate signal. A gate pad GP is connected to one end of the gate line GL, and a gate pad electrode GPE may be formed on the gate pad GP. The gate pad electrode GPE is a contact electrode for connecting an external wire for applying a signal to the first electrode PE.

The data line DL is formed on the first substrate 110, and specifically is formed to extend generally in a second direction that crosses the first direction on the gate insulating layer 140. The data line DL is insulated from the gate line GL, and acts to transfer a data signal. A data pad DP is connected to one end of the data line DL. A data pad electrode DPE may be formed on the data pad DP. The data pad electrode DPE is another contact electrode for connecting an external wire for applying a signal to the first electrode PE.

The storage line SL is formed on the first substrate 110, and specifically is formed to extend generally in the first direction on the first insulating layer 130. It further includes branch electrodes that branch out in the second direction to surround the first electrode PE (PE1 and PE2). The storage line SL may form a hold capacitor along with the first electrode PE, to strengthen the voltage hold capability of a liquid crystal capacitor that is formed between the first electrode PE and a second electrode CE.

The gate insulating layer 140 covers the gate line GL, the storage line SL, and the gate pad GP that are formed on the first insulating layer 130, and is formed of an insulating material. For example, the gate insulating layer 140 may include an inorganic material, such as silicon nitride (SiNx) or silicon oxide (SiOx).

The first thin film transistor TFT1 is arranged between the first polarizing layer 120 and the liquid crystal layer LC, is connected between the gate line GL and the data line DL, and includes a first gate electrode GE1, a first semiconductor layer SM1, a first source electrode SE1, and a first drain electrode DE1.

The first gate electrode GE1 may be formed to project from the gate line GL to underlie the first semiconductor layer SM1. The first gate electrode GE1 may include, for example, any one of indium tin oxide (ITO), indium zinc oxide (IZO), and indium tin zinc oxide (ITZO). Further, the first gate electrode GE1 may have a two-layer structure that includes a first electrode layer that is composed of the above-described material, and a second electrode layer that may be made of a metal, such as copper (Cu), molybdenum (Mo), aluminum (Al), tungsten (W), chrome (Cr), or titanium (Ti), or an alloy including at least one of the above-described metals.

The first semiconductor layer SM1 is formed on the first gate electrode GE1 so that the gate insulating layer 140 is interposed between the first semiconductor layer SM1 and the first gate electrode GE1. The first semiconductor layer SM1 may include an active layer provided on the gate insulating layer 140 and an ohmic contact layer provided on the active layer. Additionally, the first semiconductor layer SM1 may be formed between the data line DL and the gate insulating layer 140. Further, the first semiconductor layer SM1 may be formed between the data pad DP and the gate insulating layer 140.

The first source electrode SE1 is formed to project from the data line DL, and overlaps at least a part of the first gate electrode GE1 in plan view (i.e. the view of FIG. 4). The first drain electrode DE1 is formed to be spaced apart from the first source electrode SE1, and overlaps at least a part of the first gate electrode GE1 in plan view. The first drain electrode DE1 is connected to a first sub-electrode PE1 of the first electrode PE through a first contact hole CH1 that is formed in the protection layer 150. The first source electrode SE1 and the first drain electrode DE1 may be formed of, for example, a metal, such as copper, molybdenum, aluminum, tungsten, chrome, or titanium, or an alloy that includes at least one of the above-described metals. Here, the first source electrode SE1 and the first drain electrode DE1 both overlap parts of the first semiconductor layer SM1 and are separated thereon by a gap distance.

The second thin film transistor TFT2 is arranged between the first polarizing layer 120 and the liquid crystal layer LC, is connected between the gate line GL and the data line DL, and includes a second gate electrode GE2, a second semiconductor layer SM2, a second source electrode SE2, and a second drain electrode DE2.

The second gate electrode GE2 is formed to project from the gate line GL to underlie the second semiconductor layer SM2 in plan view, and is connected to the first gate electrode GE1. The second gate electrode GE2 may be formed of the same material as the material of the first gate electrode GE1. As can be seen, gate electrodes GE1 and GE2 may be parts of a single continuous protrusion from gate line GL.

The second semiconductor layer SM2 is formed on the second gate electrode GE2 so that the gate insulating layer 140 is interposed between the second semiconductor layer SM2 and the second gate electrode GE2. The second semiconductor layer SM2 may include an active layer provided on the gate insulating layer 140 and an ohmic contact layer provided on the active layer. Additionally, the second semiconductor layer SM2 may be formed between the data line DL and the gate insulating layer 140. Further, the second semiconductor layer SM2 may also be formed between the data pad DP and the gate insulating layer 140.

The second source electrode SE2 is connected to the first source electrode SE1, and overlaps at least a part of the second gate electrode GE2 in plan view. The second drain electrode DE2 is formed to be spaced apart from the second source electrode SE2, and overlaps at least a part of the second gate electrode GE2 in plan view. The second drain electrode DE2 is connected to a second sub-electrode PE2 of the first electrode PE through a second contact hole CH2 that is formed in the protection layer 150. Here, the second source electrode SE2 and the second drain electrode DE2 overlap the second semiconductor layer SM2 and are spaced apart from each other thereon by a gap. The second source electrode SE2 and the second drain electrode DE2 may be formed of the same material as the material of the first source electrode SE1 and the first drain electrode DE1.

The third thin film transistor TFT3 is arranged between the first polarizing layer 120 and the liquid crystal layer LC, is connected between the gate line GL and the data line DL, and includes a third gate electrode GE3, a third semiconductor layer SM3, a third source electrode SE3, and a third drain electrode DE3.

The third gate electrode GE3 is formed to project from the gate line GL to underlie the third semiconductor layer SM3 in plan view, and is spaced apart from the second gate electrode GE2. The third gate electrode GE3 may be formed of the same material as the material of the first gate electrode GE1.

The third semiconductor layer SM3 is formed on the third gate electrode GE3 so that the gate insulating layer 140 is interposed between the third semiconductor layer SM3 and the third gate electrode GE3. The third semiconductor layer SM3 may include an active layer provided on the gate insulating layer 140 and an ohmic contact layer provided on the active layer. Also, the third semiconductor layer SM3 may be formed between the data line DL and the gate insulating layer 140. Further, the third semiconductor layer SM3 may be formed between the data pad DP and the gate insulating layer 140.

The third source electrode SE3 is connected to the second drain electrode DE2, and overlaps at least a part of the third gate electrode GE3 in plan view. The third drain electrode DE3 is formed to be spaced apart from the third source electrode SE3, and overlaps at least a part of the third gate electrode GE3 in plan view. The third drain electrode DE2 is connected to the reference line RL (to be described later) through a third contact hole CH3 that is formed in the protection layer 150. Here, the third source electrode SE3 and the third drain electrode DE3 overlap a part of the third semiconductor layer SM3 and are spaced apart from each other thereon by a gap. The third source electrode SE3 and the third drain electrode DE3 may be formed of the same material as the material of the first source electrode SE1 and the first drain electrode DE1.

The protection layer 150 is arranged on the first thin film transistor TFT1, the second thin film transistor TFT2, and the third thin film transistor TFT3. The protection layer 150 may be formed of an inorganic material, such as silicon nitride (SiNx) or silicon oxide (SiOx), or may be formed of a low-k organic insulating layer. Further, the protection layer 150 may have a dual-layer structure including an inorganic insulating layer and an organic insulating layer. The protection layer 150 has the first contact hole CH1 for exposing a part of the first drain electrode DE1, the second contact hole CH2 for exposing a part of the second drain electrode DE2, and the third contact hole CH3 for exposing a part of the third drain electrode DE3.

The first electrode PE is arranged between the first polarizing layer 120 and the liquid crystal layer LC, and specifically is arranged within pixel PX (in FIG. 3) on the protection layer 150, and may include first sub-electrode PE1 and second sub-electrode PE2 arranged so that the thin film transistors TFT1, TFT2, and TFT3 are interposed between the first sub-electrode PE1 and the second sub-electrode PE2 in plan view.

The first sub-electrode PE1 contacts the first drain electrode DE1 through the first contact hole CH1. The first sub-electrode PE1 may include a slit pattern having a plurality of openings. For example, the first sub-electrode PE1 may include a trunk portion PE1$a$, a plurality of branch portions PE1$b$ extending to project from the trunk portion PE1$a$, and a connection electrode PE1$c$ connecting the trunk portion PE1$a$ and the first drain electrode DE1 to each other. The trunk portion PE1$a$ may be formed to include one horizontal line and three vertical lines. One vertical line may cross the one horizontal line, and the other two vertical lines may be connected to both sides of the one horizontal line. The branch portions PE1$b$ may be formed to extend toward the storage line SL at acute angles with respect to the trunk portion PE1$a$. The trunk portion PE1$a$ and the plurality of branch portions PE1$b$ are not limited to the arrangement as illustrated in FIG. 4, but may have various arrangements and shapes. The first sub-electrode PE1 may include a transparent conductive material. For example, the first sub-electrode PE1 may include indium tin oxide (ITO) or indium zinc oxide (IZO). The first sub-electrode PE1 may partially overlap the storage line SL to form a storage capacitor.

The second sub-electrode PE2 comes in contact with the second drain electrode DE2 through the second contact hole CH2. Similar to the first sub-electrode PE1, the second sub-electrode PE2 may include a slit pattern having a plurality of openings. For example, the second sub-electrode PE2 may include a trunk portion PE2$a$, a plurality of branch portions PE2$b$ extending to project from the trunk portion PE2$a$, and a connection electrode PE2$c$ connecting the trunk portion PE2$a$ and the second drain electrode DE2 to each other. The trunk portion PE2$a$ may be formed to include one horizontal line and three vertical lines. The branch portions PE2$b$ may be formed to extend toward the storage line SL at acute angles with respect to the trunk portion PE2$a$. The trunk portion PE2$a$ and the plurality of branch portions PE2$b$ are not limited to the arrangement as illustrated in FIG. 4, but may have various arrangements and shapes. The second sub-electrode PE2 may be formed of the same material as the material of the first sub-electrode PE1. The second sub-electrode PE2 may partially overlap the storage line SL to form a storage capacitor. Also, the size of the first sub-pixel in which the first sub-electrode PE1 is arranged may be different from the size of the second sub-pixel in which the second sub-electrode PE2 is arranged. For example, the size of the second sub-pixel may be larger than the size of the first sub-pixel.

The reference line RL is arranged on the protection layer 150. The reference line RL is formed to include a projection portion which extends in the second direction, overlaps a part of the data line DL in plan view, and extends so as to overlap a part of the third thin film transistor TFT3. In particular, a projection portion, or extension, of the reference line RL comes in contact with the third drain electrode DE3 of the third thin film transistor TFT3. Further, the reference line RL may be formed to extend into a gap area between the first sub-pixel PE1 and the second sub-pixel PE2. The reference line RL may be formed of the same material as the material of the first sub-electrode PE1 and the second sub-electrode PE2, and may be formed on the same layer as the layer of the first sub-electrode PE1 and the second sub-electrode PE2.

A reference voltage having the same level as the level of the voltage applied to storage line SL may be applied to the reference line RL. The reference line RL may make the voltage between the second sub-electrode PE2 and the second electrode CE lower than the voltage between the first sub-electrode PE1 and the second electrode CE, by lowering of the voltage that is applied to the second sub-electrode PE2 through the third thin film transistor TFT3. Through this, liquid crystal molecules positioned in an area that corresponds to the first sub-pixel and first sub-electrode PE1, and liquid crystal molecules positioned in an area that corresponds to the second sub-pixel and second sub-electrode PE2, receive different electric field strengths and are thus inclined at different angles. Accordingly, the liquid crystal molecules positioned in the area that corresponds to the first sub-pixel and the liquid crystal molecules positioned in the area that corresponds to the second sub-pixel have different inclination angles, to make the luminance of the first sub-pixel differ from the luminance of the second sub-pixel. Accordingly, side visibility can be improved. Additionally, the reference line RL may act as a shielding electrode that prevents electromagnetic interference between the data line DL and the first electrode PE, and between the data line DL and the second electrode CE.

The second display plate 200 includes a second substrate 210, a black matrix BM, a color filter CF, an overcoat layer 220, second electrode CE, and a second polarizing layer 230.

The second substrate 210 has a curvature at least partly corresponding to the shape of the curved display device 50, and faces the first substrate 110. The second substrate 210 may include a material having superior visible light permeability, heat resistance, and chemical resistance. For example, the second substrate 210 may include any one of glass, polyethylenenaphthalate, polyethyleneterephthalate, and polyacryl, which have superior light permeability. The second substrate 210 may have a second thickness t2 that is equal to the first thickness t1 of the first substrate 110. In the process of manufacturing the curved display device 50 through fastening of the flat display panel 10 to curved backlight unit 20, the second substrate 210 may receive a second stress that is approximately equal to the first stress of the first substrate 110.

The black matrix BM is arranged on a lower portion of the second substrate 210. Specifically, the black matrix BM is arranged to correspond to at least part of the non-pixel area NPA. For example, the black matrix BM may overlap the gate line GL and the thin film transistors TFT1, TFT2, and TFT3. That is, in the case where the display panel is curved around an axis corresponding to a direction that is in parallel to the data line to implement the curved display device, an area in which an image is actually displayed (i.e., a portion where the first electrode is formed) can be prevented from being decreased in size due to an invasion of the black matrix that overlaps the data line into the first electrode portion as the first display plate and the second display plate are misaligned. Further, the black matrix BM is arranged to correspond to the non-display area NDA. The black matrix BM as described above intercepts unnecessary light. In some embodiments, the black matrix BM may be formed on the first substrate 110. In this case, the black matrix BM may overlap the gate line GL, the data line DL, and the thin film transistors TFT1, TFT2, and TFT3. In this case, even if the first display plate and the second display plate are misaligned in the case where the display panel is curved, both the black matrix and the first electrode are positioned on the first substrate, and thus the black matrix that overlaps the data line does not invade the portion where the first electrode is formed. Accordingly, the area in which the image is actually displayed can be prevented from being decreased in size.

The color filter CF is arranged on a lower portion of the second substrate 210. The color filter CF is to provide a color to the light that permeates the liquid crystal layer LC. The color filter CF may include a red color filter, a green color filter, a blue color filter, and/or any other desired color. The color filter CF may be provided to correspond to each pixel area PA, and may be arranged to have different colors between adjacent pixels PX. That is, different pixel areas PA may have differently-colored color filters CF. The color filters CF may partially overlap each other or may be spaced apart from each other at boundaries between adjacent pixels PX. In some embodiments, the color filter CF may be formed on the first substrate 110.

The overcoat layer 220 is formed on lower portions of the color filter CF and the black matrix BM. The overcoat layer 220 serves to perform planarization, protection, and insulation of the color filter CF, and may be formed, for example, using acrylic epoxy material.

The second electrode CE may be arranged between the overcoat layer 220 and the liquid crystal layer LC, and may be formed over substantially the entire overcoat layer 220, although this need not necessarily be the case. The second electrode CE is electrically connected to a common electrode (not illustrated). The second electrode CE may include a transparent conductive material. For example, the second electrode CE may include indium tin oxide (ITO) or indium zinc oxide (IZO).

The second polarizing layer 230 is arranged outside the second substrate 210, and may be formed over substantially the entire second substrate 210. The second polarizing layer 230 polarizes the light that has passed through the liquid crystal layer LC in a direction that is perpendicular to the specific direction as described above. For example, as illustrated in FIG. 7, the second polarizing layer 230 is formed to have an optical axis OA2 of 90°, which is orthogonal to the optical axis OA1 (in FIG. 6) of 0°, and thus polarizes the light that has passed through the liquid crystal layer LC by 90°. On the other hand, in the case where the alignment of liquid crystal molecules of the liquid crystal layer LC is controlled to display a black image, the light that has passed through the liquid crystal layer LC should not pass through the second polarizing layer 230. However, if the light that has passed through the liquid crystal layer LC passes through a second substrate 210 having an optical anisotropy phenomenon, phase retardation may occur in the light that has passed through the liquid crystal layer LC. If phase-retarded light is provided to the second polarizing layer 230, a part of the phase-retarded light may pass through the second polarizing layer 230 to cause a slight light leakage phenomenon to occur during black images. The slight light leakage phenomenon is not greatly recognized, i.e. is not prominently visible, typically. The optical anisotropy phenomenon of the second substrate 230 may occur due to second stress that is generated on the second substrate 230 in the process of manufacturing the curved display device 50 through fastening of the flat display panel 10 to the backlight unit 20 having a curvature. That is, when the flat display panel 10 is fastened to a curved backlight unit 20, the second stress occurs in portions of the second substrate 230 which are bent to conform to the curvature of the backlight unit 20 and portions of the second substrate 230 corresponding to the fastening points of the display panel 10 and the backlight unit 20, resulting in the second substrate 230 that exhibits optical anisotropy.

The second polarizing layer 230 may be an absorption type polarizing layer that absorbs light that is not polarized in the direction that is perpendicular to the specific direction, or a reflection type polarizing layer that reflects light that is not polarized in the direction that is perpendicular to the specific direction. In FIGS. 5 and 7, it is illustrated that the second polarizing layer 230 is formed as an absorption type polarizing layer. In the case where the second polarizing layer 230 is formed as a reflection type polarizing layer, the second polarizing layer 230 may absorb an external light that is incident to the second polarizing layer 230. Thus, a glare phenomenon occurring due to external light that is incident to the second polarizing layer 230 and then is reflected from the second polarizing layer 230 can be decreased. FIG. 7 illustrates that the second polarizing layer 230 is arranged over substantially the entire second substrate 210, but embodiments of the invention are not limited thereto. In some embodiments, the second polarizing layer 230 may be arranged to correspond only to the display area DA, for example.

The liquid crystal layer LC of the display panel 10 includes liquid crystal molecules having a dielectric anisotropy. The long axes of the liquid crystal molecules may be arranged vertically or horizontally with respect to the surfaces of the two display plates 100 and 200.

In the curved display device 50 having the above-described structure, the first thin film transistor TFT1 and the second thin film transistor TFT2 receive a gate signal that is provided through the gate line GL and a data signal that is provided through the data line DL. Accordingly, the first thin film transistor TFT1 and the second thin film transistor TFT2 are turned on, and voltages that correspond to the data signal are provided to the first sub-electrode PE1 and the second sub-electrode PE2, respectively. In this case, the voltage that is applied to the second sub-electrode PE2 may be divided by turning on the third thin film transistor TFT3 that is connected to the reference line RL to which the reference voltage is applied, and thus may be lower than the voltage that is applied to the first sub-electrode PE1. Electric fields having different levels are thereby formed between the first and second sub-electrodes PE1 and PE2, to which different voltages are supplied, and the second electrode CE, to which the common voltage is applied. In accordance with the different electric fields, the liquid crystal molecules posi-tioned between the first sub-electrode PE1 and the second electrode CE, and the liquid crystal molecules positioned between the second sub-electrode PE2 and the second electrode CE, are driven by differing voltages, and as a result, an image is displayed in accordance with the quantity of light that penetrates the liquid crystal layer LC.

As described above, according to the curved display device 50 according to an embodiment of the present invention, the first polarizing layer 120 is formed between the first substrate 110 and the liquid crystal layer LC, and thus the light provided to the liquid crystal layer LC is polarized even when the first substrate 110 exhibits optical anisotropy.

Accordingly, in the curved display device 50 according to an embodiment of the present invention, in the case where the first polarizing layer is arranged outside the first substrate, the display of an unwanted image, for example the occurrence of a light leakage phenomenon in a black image, can be prevented. In particular, detrimental effects caused by light having polarization characteristics different from the polarization characteristic of the first polarizing layer can be reduced.

Next, a curved display device according to another embodiment of the present invention will be described.

Figure 8:
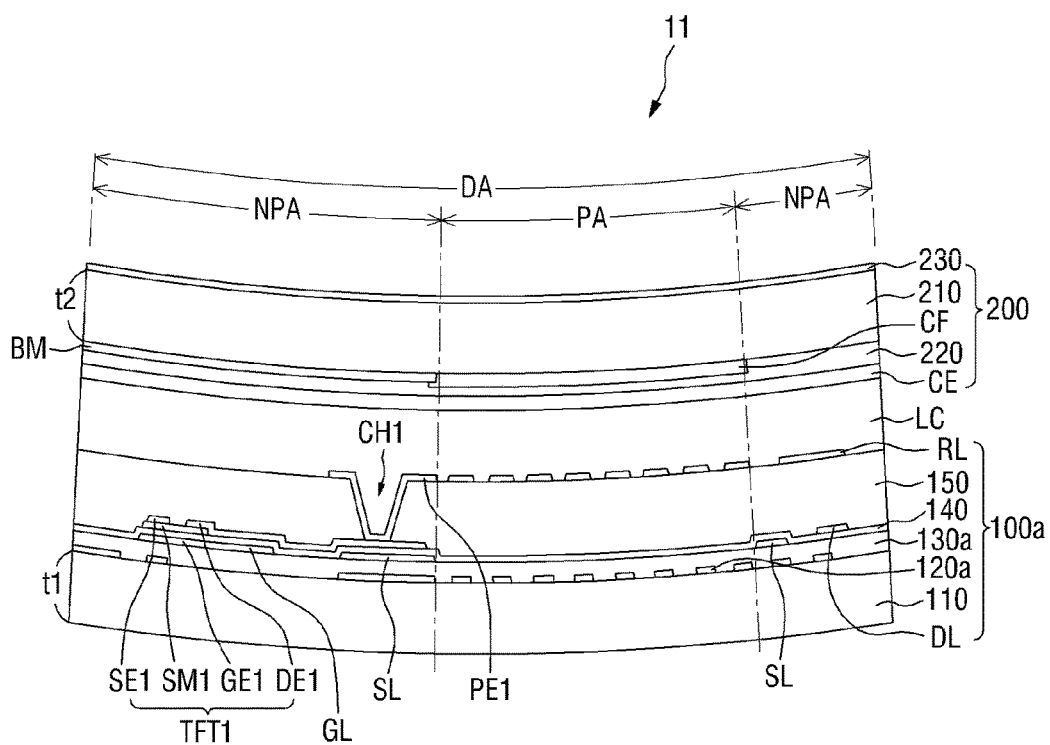
FIG. 8 is a cross-sectional view of another embodiment of a display panel that corresponds to the display panel of FIG. 5.
Figure 9:
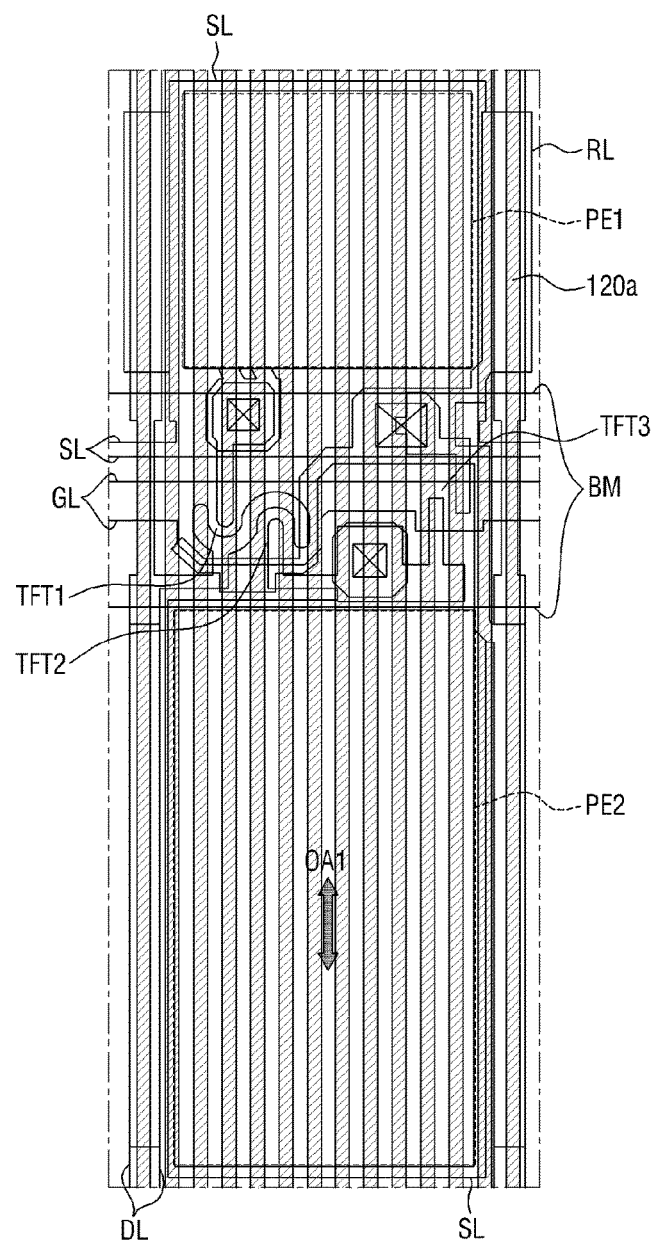
FIG. 9 is a plan view of one pixel explaining the display panel of FIG. 8.
Figure 10:
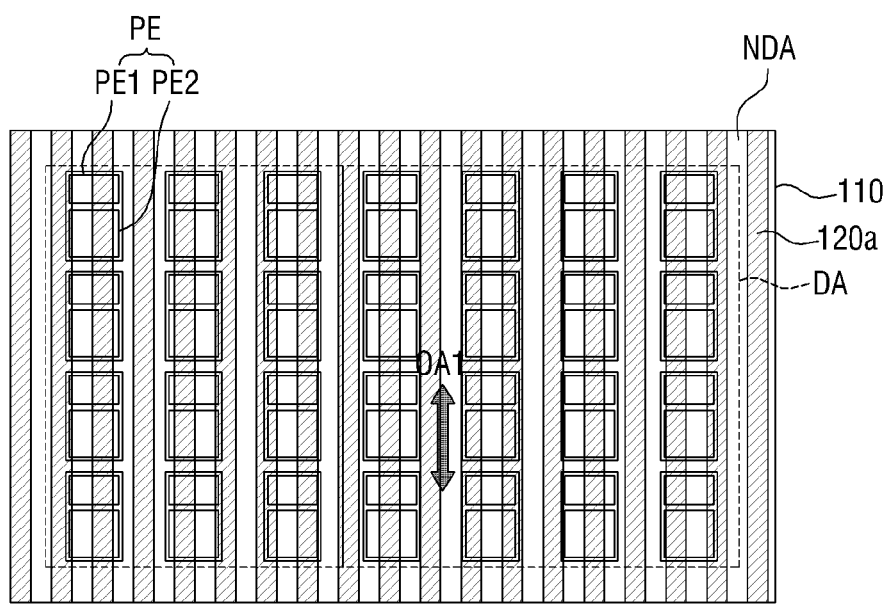
FIG. 10 is a layout diagram illustrating an arrangement of a first polarizing layer on a first substrate of the display panel of FIG. 8.
Figure 11:
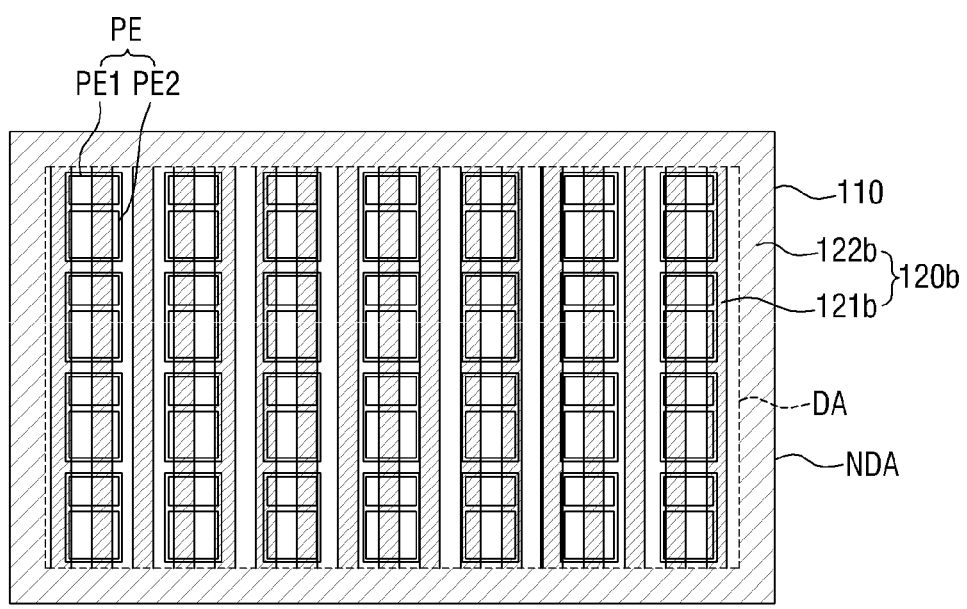
FIGS. 11 and 12 are layout diagrams illustrating various embodiments of the first polarizing layer of FIG. 10.
Figure 12:
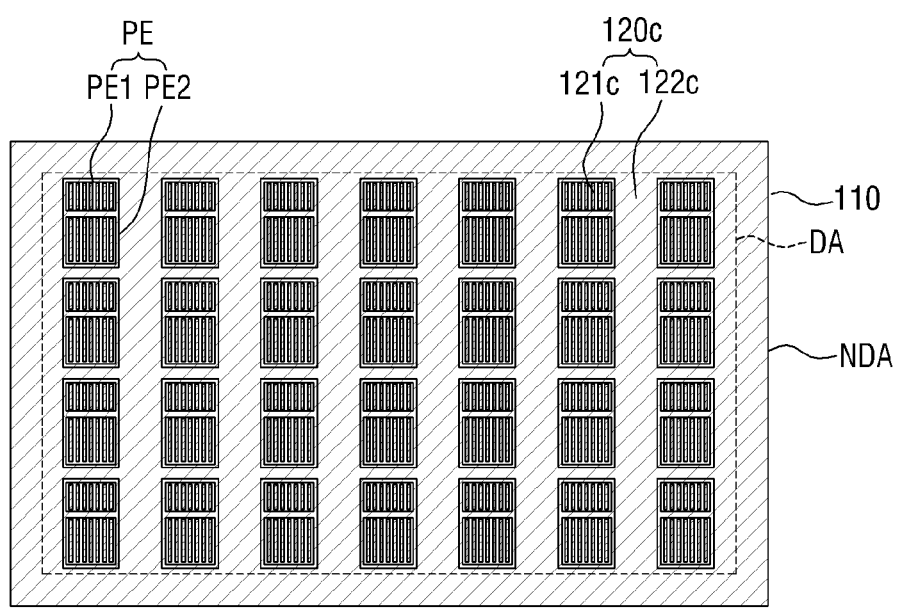

FIG. 8 is a cross-sectional view of a different embodiment of a display panel constructed according to FIG. 5. FIG. 9 is a plan view of one pixel further explaining the display panel of FIG. 8, and FIG. 10 is a layout diagram illustrating an arrangement of a first polarizing layer on a first substrate of the display panel of FIG. 8. FIGS. 11 and 12 are layout diagrams illustrating various embodiments of the first polarizing layer of FIG. 10. FIG. 9 illustrates that the first sub-electrode PE1 and the second sub-electrode PE2 are formed in a rectangular area indicated as a dotted line, but the detailed shapes of the first sub-electrode PE1 and the second sub-electrode PE2 are omitted.

Referring to FIG. 8, a curved display device according to another embodiment of the present invention has largely the same configuration as the configuration of the curved display device 50 of FIG. 2, but display panel 11 is different from the display panel 10 of the curved display device 50. Accordingly, explanation of the curved display device of the present embodiment will focus on the display panel 11.

The display panel 11 may include a first display plate 100a and a second display plate 200 that face each other. The first display plate 100a and the second display plate 200 may be bonded together by a sealant (not illustrated), as is known. A liquid crystal layer LC may be interposed between the first display plate 100a and the second display plate 200.

The first display plate 100a of the display panel 11 is similar to the first display plate 100 of FIG. 5, and includes a first substrate 110, a first polarizing layer 120a, a first insulating layer 130a, a gate line GL, a data line DL, a storage line SL, a reference line RL, a gate insulating layer 140, a first thin film transistor TFT1, a second thin film transistor TFT2, a third thin film transistor TFT3, a protection layer 150, and a first electrode PE.

In this embodiment, the first polarizing layer 120a is formed as a reflection type polarizing layer. In this case, the first polarizing layer 120a is not a continuous layer, but is instead composed of a plurality of metal lines. The plurality of metal lines 121 are formed to extend in one direction on the first substrate 110 through a patterning method and to be spaced apart from each other at a predetermined interval in a direction that is perpendicular to the one direction. The predetermined interval may be in the range of several tens or several hundreds of nanometers (nm). The one direction may be a direction in which the first polarizing layer 120a is to have an optical axis OA1 of 0°. The first polarizing layer 120a may include a conductive material, for example, at least one of Al, Au, Cu, Cr, Fe, and Ni.

If the first polarizing layer 120a is formed as a reflection type polarizing layer as described above, the first polarizing layer 120a can be directly formed on the first substrate 110 through a patterning process without any separate attachment process for attaching the first polarizing layer 120a to the first substrate 110. Accordingly, the first polarizing layer 120a can be relatively easily formed. FIG. 10 illustrates that the plurality of metal lines that constitute the first polarizing layer 120a are formed over substantially the entire first substrate 110. That is, the plurality of metal lines is arranged in not only the display area DA but also the non-display area NDA. In this case, some of the light that is reflected from the plurality of metal lines arranged in the display area DA and some of the light that is reflected from the plurality of metal lines arranged in the non-display area NDA are re-incident to the first polarizing layer 120a, and thus light use efficiency can be improved. On the other hand, the pattern of the first polarizing layer 120a is not limited to the pattern illustrated in FIG. 10. For example, a first polarizing layer 120b of FIG. 11 or a first polarizing layer 120c of FIG. 12 may be arranged on the first substrate 110 instead of the first polarizing layer 120a. Hereinafter, this will be described in further detail.

The first insulating layer 130a is similar to the first insulating layer 130 of FIG. 5. However, the first insulating layer 130a is formed to cover the first polarizing layer 130a on the first substrate 110.

FIG. 11 exemplifies that a first polarizing layer 120b includes a plurality of metal lines 121b arranged in the display area DA and metal pieces 122b arranged in the non-display area NDA. The plurality of metal lines 121b is the same as the plurality of metal lines that constitutes the first polarizing layer 120a of FIG. 10. The metal pieces 122b may be formed together with the plurality of metal lines 121b, and may have the same height as the height of the plurality of metal lines 121b. Since the first polarizing layer 120b is provided with metal pieces 122b having relatively large surface areas in the non-display area NDA, the light that is reflected from the plurality of metal lines 121b in the display area DA and the light that is reflected from the metal pieces 122b in the non-display area NDA can fall re-incident to the first polarizing layer 120b, and thus the light use efficiency can be greatly improved.

FIG. 12 exemplifies that a first polarizing layer 120c includes a plurality of metal lines 121c arranged on the first electrode PE, specifically on the first sub-electrode PE1 and the second sub-electrode PE2, and metal pieces 122c arranged in the area outside that of the first electrode PE, including the non-display area NDA. The metal pieces 122c may be formed together with the plurality of metal lines 121c, and may have the same height as the height of the plurality of metal lines 121c. Since the first polarizing layer 120c has metal pieces 122c with relatively large surface areas outside the first electrodes PE, the light that is reflected from the plurality of metal lines 121c in the display area DA and the light that is reflected from the metal pieces 122c in the non-display area NDA can eventually fall re-incident to the first polarizing layer 120c, and thus the light use efficiency can be greatly improved.

Since the second display plate 200 of the display panel 11 has been described in detail with reference to FIG. 5, duplicate explanation thereof will be omitted.

As described above, in the curved display device according to another embodiment of the present invention, since the first polarizing layer 120 is composed of the plurality of metal lines formed between the first substrate 110 and the liquid crystal layer LC, the first polarizing layer 120a can be more easily formed on the first substrate 110, and light use efficiency can be heightened. Further, the light that maintains the polarization characteristic of the first polarizing layer 120a can be provided to the liquid crystal layer LC even if the first substrate 110 exhibits optical anisotropy.

Accordingly, in the curved display device according to another embodiment of the present invention, in the case where the first polarizing layer is arranged outside the first substrate, the display of an unwanted image, for example the occurrence of a light leakage phenomenon in a black image, can be prevented. In particular, detrimental effects caused by light having polarization characteristics different from the polarization characteristic of the first polarizing layer, can be reduced.

Next, a curved display device according to still another embodiment of the present invention will be described.

Figure 13:
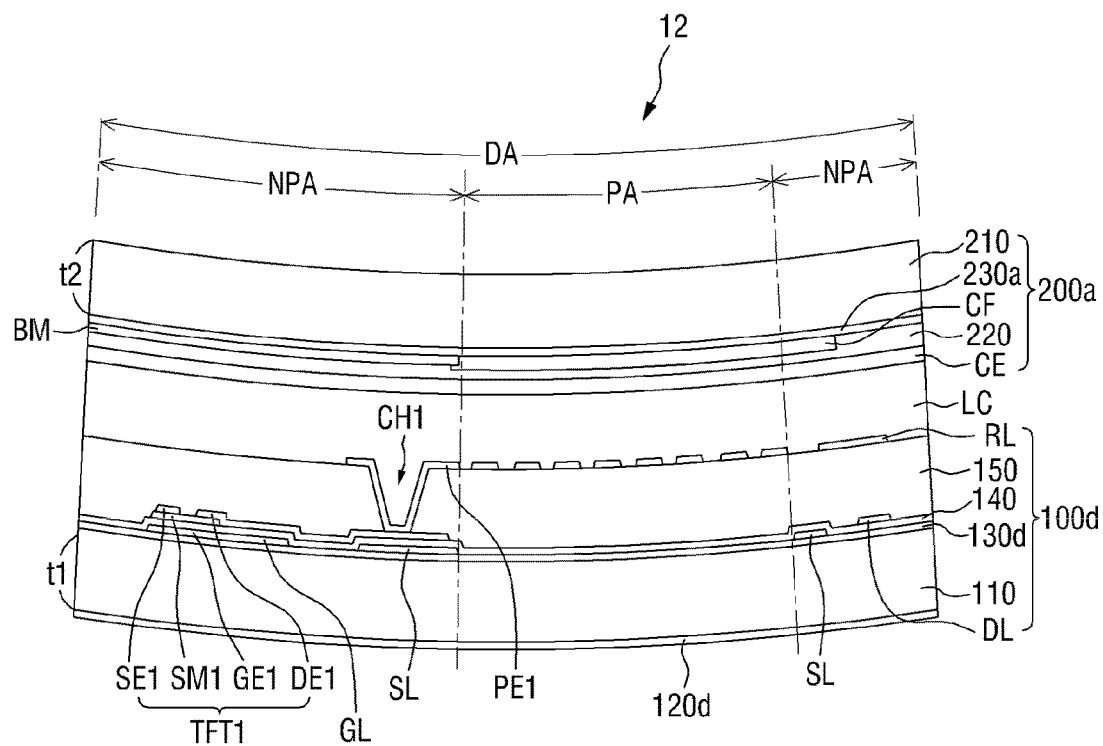
FIG. 13 is a cross-sectional view of still another embodiment of a display panel that corresponds to the display panel of FIG. 5.

FIG. 13 is a cross-sectional view of a different embodiment of a display panel constructed according to FIG. 5.

Referring to FIG. 13, a curved display device according to this embodiment of the present invention has largely the same configuration as the configuration of the curved display device 50 of FIG. 2, except that display panel 12 is different from the display panel 10 of the curved display device 50. Accordingly, explanation of the curved display device according to the present embodiment of the present invention will focus on the display panel 12.

The display panel 12 may include a first display plate 100d and a second display plate 200a that face each other. The first display plate 100d and the second display plate 200a may be bonded together by a sealant (not illustrated), as is known. A liquid crystal layer LC may be interposed between the first display plate 100d and the second display plate 200a.

The first display plate 100d of the display panel 12 is similar to the first display plate 100 of FIG. 5, and includes a first substrate 110, a first polarizing layer 120d, a first insulating layer 130d, a gate line GL, a data line DL, a storage line SL, a reference line RL, a gate insulating layer 140, a first thin film transistor TFT1, a second thin film transistor TFT2, a third thin film transistor TFT3, a protection layer 150, and a first electrode PE.

However, the first polarizing layer 120d is arranged outside the first substrate 110. Accordingly, the first polarizing layer 120d polarizes light that is provided from the backlight unit 20 in a specific direction, and provides the polarized light to the first substrate 110. Accordingly, if the first substrate 110 exhibits optical anisotropy, phase retardation may occur in the light that is polarized by the first polarizing layer 120d when the polarized light subsequently passes through the first substrate 110. The phase-retarded light is then provided to the liquid crystal layer LC, and the polarization characteristic of the light that is provided to the liquid crystal layer LC may become different from the polarization characteristic of the light that is first polarized by the first polarizing layer 120d. This may cause unwanted light to be included in the light that is polarized by the second polarizing layer 230a. For example, in the case where the alignment of the liquid crystal molecules of the liquid crystal layer LC is controlled so that the curved display device displays a black image, a slight light leakage phenomenon may occur on the black image. The slight light leakage phenomenon may not be significant, but is still undesirable.

The first polarizing layer 120d may be an absorption type polarizing layer or a reflection type polarizing layer like the first polarizing layer 120. FIG. 13 exemplifies a case where the first polarizing layer 120d is formed as an absorption type polarizing layer having an optical axis OA1 (in FIG. 6) of 0°. The first polarizing layer 120d may be arranged over substantially the entire first substrate 110, but is not limited thereto. In some embodiments, the first polarizing layer 120d may be arranged to correspond only to the display area DA.

The first insulating layer 130d is similar to the first insulating layer 130 of FIG. 5. However, the first insulating layer 130d is directly formed on the first substrate 110. In some embodiments, the first insulating layer 130a may be omitted.

The second display plate 200a of the display panel 12 is similar to the second display plate 200 of FIG. 5, and includes a second substrate 210, a black matrix BM, a color filter CF, an overcoat layer 220, a second electrode CE, and a second polarizing layer 230a.

The second polarizing layer 230a is formed between the second substrate 210 and the liquid crystal layer LC. For example, the second polarizing layer 230a may be formed between the second substrate 210 and the color filter CF. That is, the second polarizing layer 230a is formed on the second substrate 210 prior to other structures including the color filter CF, and may therefore not be affected by high temperature that is applied to form the other structures. Further, the second polarizing layer 230a may be arranged directly on the second substrate 210, and may thus be relatively easily attached to the flat surface of the second substrate 210 or may be relatively easily manufactured on the flat surface of the second substrate 210.

The second polarizing layer 230a plays a similar role to the role of the polarizing layer 230 of FIG. 5. However, the second polarizing layer 230a is arranged between the second substrate 210 and the liquid crystal layer LC, and thus polarizes light that has passed through the liquid crystal layer LC, to provide polarized light to the second substrate 210. Accordingly, the second polarizing layer 230a can polarize the light that is provided from the liquid crystal layer LC regardless of the phase retardation of the light that occurs due to the optical anisotropy of the second substrate 210. Thus, in the case where the second polarizing layer is arranged outside the second substrate and polarizes the phase-retarded light, inclusion of unwanted light in the polarized light can be reduced. However, as described above, since the light that is polarized by the first polarizing layer 120d is provided to the liquid crystal layer LC in a state where the polarization characteristic of the polarized light is changed, some unwanted light may be included in the light that is polarized by the second polarizing layer 230a, but not to a significant degree.

The second polarizing layer 230a may be an absorption type polarizing layer or a reflection type polarizing layer. FIG. 13 exemplifies a case where the second polarizing layer 230a is formed as an absorption type polarizing layer having an optical axis OA2 (in FIG. 7) of 90°. The second polarizing layer 230a may be arranged to cover substantially the entire surface of second substrate 210, but is not limited thereto. In some embodiments, the second polarizing layer 230a may be arranged to correspond only to the display area DA.

As described above, according to the current embodiment of the present invention, second polarizing layer 230a is formed between the second substrate 210 and the liquid crystal layer LC, and thus even if the optical anisotropy phenomenon occurs on the second substrate 210, the second polarizing layer 230a can polarize light that is provided from the liquid crystal layer LC regardless of whether the second substrate 210 exhibits optical anisotropy.

Accordingly, in the curved display device of this embodiment, when the second polarizing layer is arranged outside the second substrate, the display of an unwanted image, for example the occurrence of a light leakage phenomenon in a black image, which is caused by phase retardation due to the optical anisotropy of the second substrate, can be reduced.

Next, a curved display device according to still another embodiment of the present invention will be described.

Figure 14:
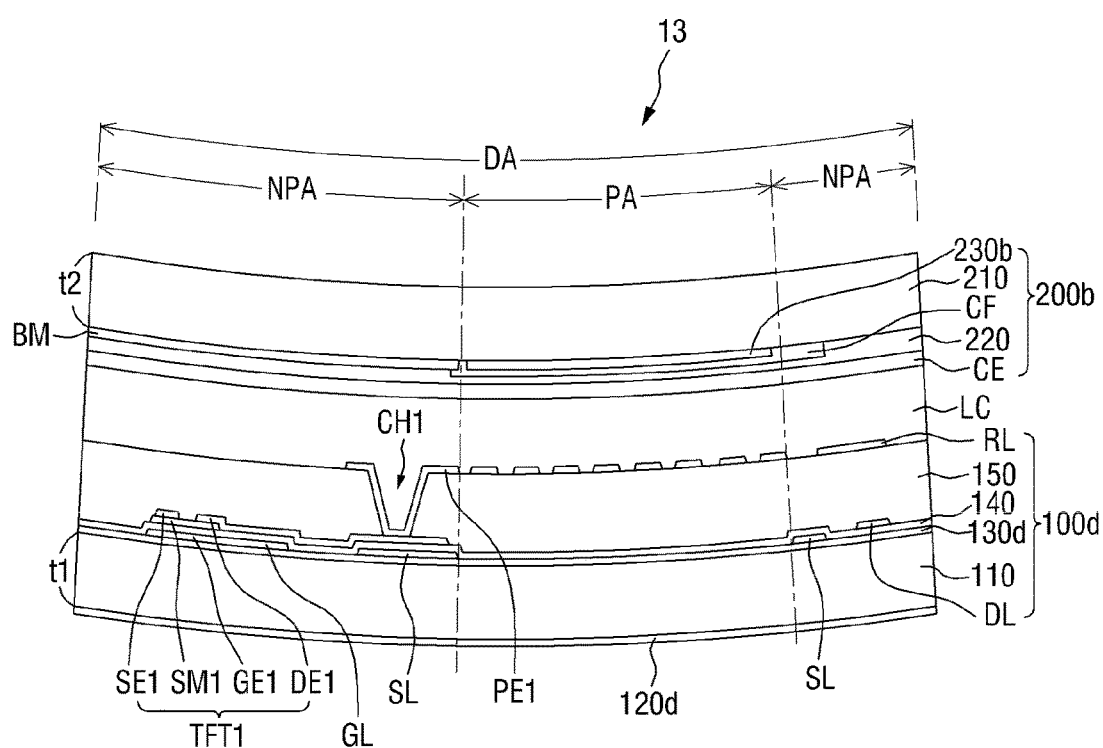
FIG. 14 is a cross-sectional view of a still further embodiment of a display panel that corresponds to the display panel of FIG. 5.
Figure 15:
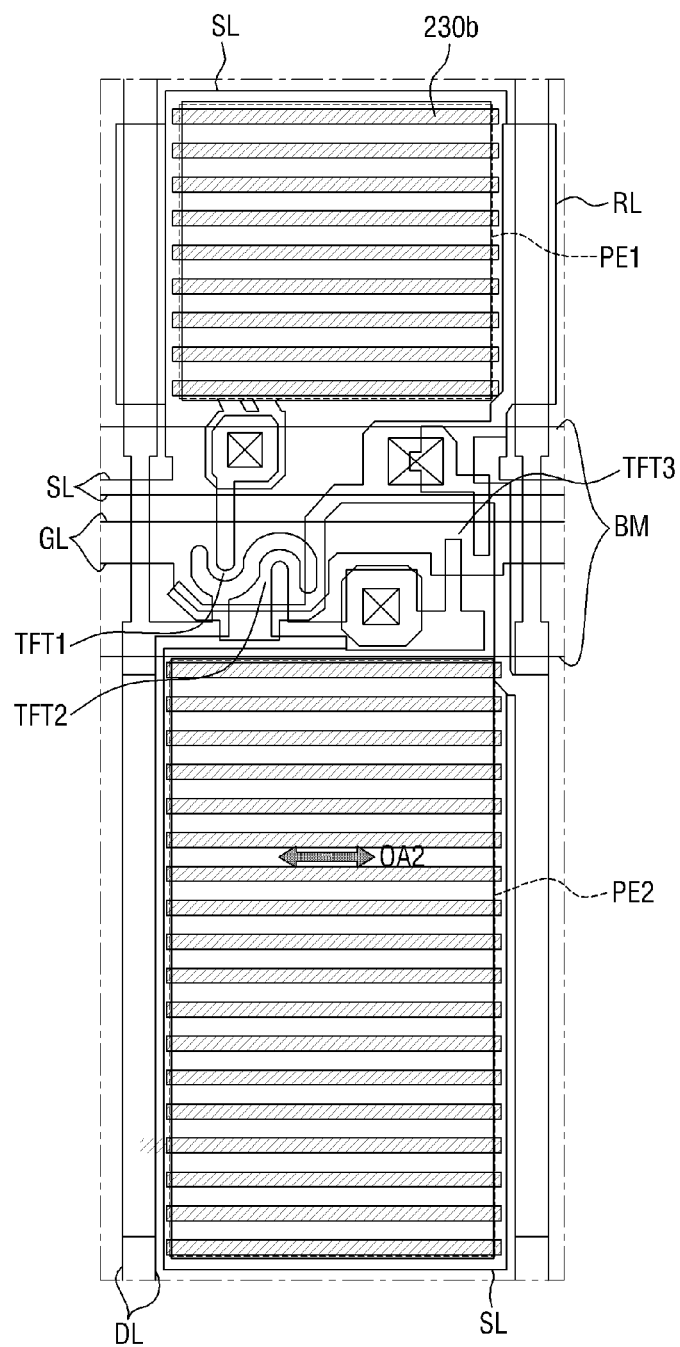
FIG. 15 is a plan view of one pixel explaining the display panel of FIG. 14.

FIG. 14 is a cross-sectional view of a different embodiment of a display panel constructed according to FIG. 5, and FIG. 15 is a plan view of one pixel in the display panel of FIG. 14.

Referring to FIG. 14, a curved display device according to still another embodiment of the present invention has the same configuration as that of the curved display device 50 of FIG. 2, except that display panel 13 is different from the display panel 10 of the curved display device 50. Accordingly, explanation of the curved display device according to this embodiment of the present invention will focus on the display panel 13.

The display panel 13 may include a first display plate 100d and a second display plate 200b that face each other. The first display plate 100d and the second display plate 200b may be bonded together by a sealant (not illustrated) in known manner. A liquid crystal layer LC may be interposed between the first display plate 100d and the second display plate 200b.

Since the first display plate 100d of the display panel 13 has been described in detail, duplicate explanation thereof will be omitted.

The second display plate 200b of the display panel 13 is similar to the second display plate 200 of FIG. 5, and includes a second substrate 210, a black matrix BM, a color filter CF, an overcoat layer 220, a second electrode CE, and a second polarizing layer 230b.

Here, the second polarizing layer 230b is formed between the second substrate 210 and the liquid crystal layer LC. For example, the second polarizing layer 230b may be formed between the second substrate 210 and the color filter CF. That is, the second polarizing layer 230b is formed on the second substrate 210 prior to other structures including the color filter CF, and thus may not be affected by high temperature that is applied to form the other structures. Further, the second polarizing layer 230b may be arranged directly on the second substrate 210, and may thus be relatively easily attached to the flat surface of the second substrate 210 or may be relatively easily manufactured on the flat surface of the second substrate 210.

The second polarizing layer 230b plays a similar role to the role of the polarizing layer 230 of FIG. 5. However, the second polarizing layer 230b is arranged between the second substrate 210 and the liquid crystal layer LC, and polarizes light that has passed through the liquid crystal layer LC so as to provide polarized light to the second substrate 210. Accordingly, the second polarizing layer 230b can polarize light that is provided from the liquid crystal layer LC regardless of the phase retardation of the light that occurs due to the optical anisotropy of the second substrate 210. Thus, relative to the case where the second polarizing layer is arranged outside the second substrate and polarizes the phase-retarded light, inclusion of unwanted light in the polarized light can be reduced. However, as described above, since the light that is polarized by the first polarizing layer 120d is provided to the liquid crystal layer LC in a state where the polarization characteristic of the polarized light is changed, some unwanted light may be included in the light that is polarized by the second polarizing layer 230b, but not to a significant degree.

The second polarizing layer 230b may be an absorption type polarizing layer which absorbs light that is not polarized in the direction that is perpendicular to the specific direction, or a reflection type polarizing layer which reflects light that is not polarized in the direction that is perpendicular to the specific direction. FIGS. 14 and 15 exemplify a case where the second polarizing layer 230b is formed as a reflection type polarizing layer having an optical axis OA2 of 90°. In this case, the second polarizing layer 230b may be arranged on the first electrode PE, specifically, on the first sub-electrode PE1 and the second sub-electrode PE2 only, and may include a plurality of metal lines that are perpendicular to the plurality of metal lines of FIG. 9. Accordingly, in the case where the second polarizing layer 230b is formed as a reflection type polarizing layer, a glare phenomenon caused by external light incident to the second polarizing layer 230b reflecting from the second polarizing layer 230b can be minimized. On the other hand, in the case where the plurality of metal lines that constitute the second polarizing layer 230b is arranged on the first electrode PE, specifically, on the first sub-electrode PE1 and the second sub-electrode PE2 only, the second polarizing layer 230b may be at the same level as the level of the black matrix BM.

As described above, according to the curved display device of this embodiment of the present invention, since the second polarizing layer 230b is formed between the second substrate 210 and the liquid crystal layer LC, the occurrence of the glare phenomenon can be minimized, and even if the second substrate 210 exhibits optical anisotropy, the second polarizing layer 230b can polarize the light that is provided from the liquid crystal layer LC regardless of any resulting phase retardation from the second substrate 210.

Accordingly, in the curved display device of this embodiment of the present invention, in the case where the second polarizing layer is arranged outside the second substrate, the display of undesired image effects caused by phase retardation due to optical anisotropy of the second substrate, can be reduced.

Next, a curved display device according to still another embodiment of the present invention will be described.

Figure 16:
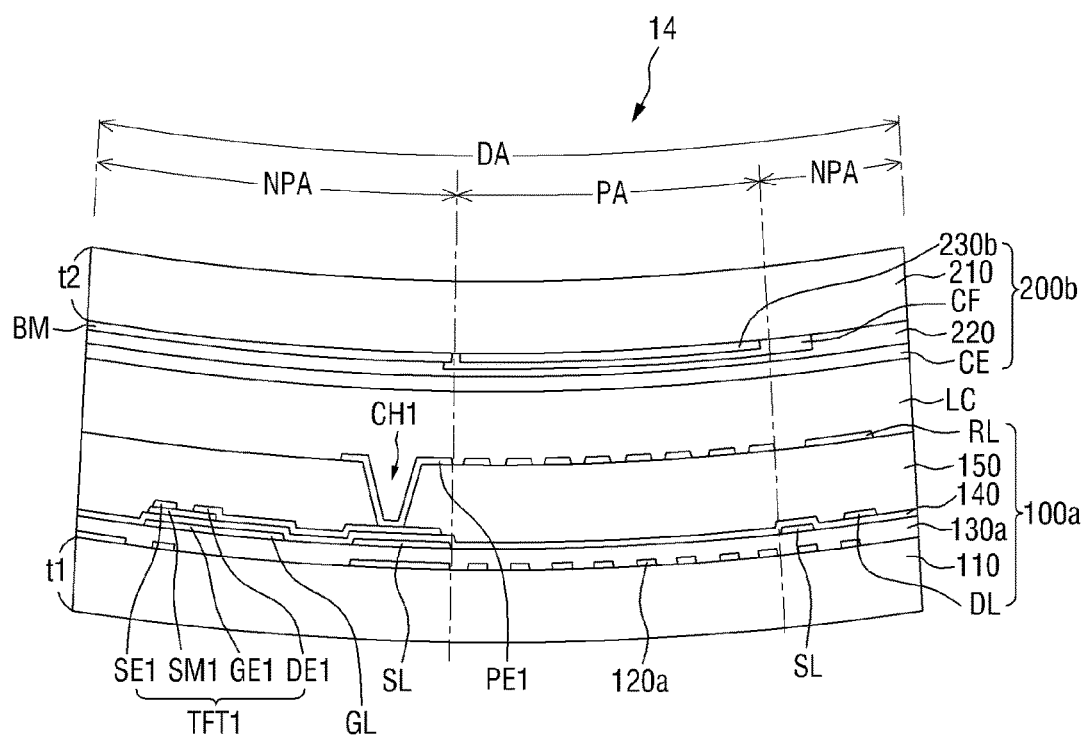
FIG. 16 is a cross-sectional view of still another embodiment of a display panel that corresponds to the display panel of FIG. 5.

FIG. 16 is a cross-sectional view of a different embodiment of a display panel constructed according to FIG. 5.

Referring to FIG. 16, a curved display device according to this embodiment of the present invention has largely the same configuration as the configuration of the curved display device 50 of FIG. 2, except that display panel 14 is different from the display panel 10 of the curved display device 50. Accordingly, explanation of the curved display device of this embodiment of the present invention will focus on the display panel 14.

The display panel 14 may include a first display plate 100a and a second display plate 200b that face each other. The first display plate 100a and the second display plate 200b may be bonded together by a sealant (not illustrated) in known manner. A liquid crystal layer LC may be interposed between the first display plate 100a and the second display plate 200b.

Since the first display plate 100a of the display panel 14 has been described in detail with reference to FIG. 8, duplicate explanation thereof will be omitted.

Also, as the second display plate 200b of the display panel 14 has been described in detail with reference to FIG. 14, duplicate explanation thereof will be omitted.

However, according to the display panel 14, since the polarization characteristic of the light that is provided to the liquid crystal layer LC is the polarization characteristic of the light that is polarized by the first polarizing layer 120a, and light that has passed through the liquid crystal layer LC is provided to the second polarizing layer 230b before being provided to the second substrate 210, the light that has passed through the liquid crystal layer LC can be polarized by the second polarizing layer 230b without being affected by the optical anisotropy of the second substrate 210.

Accordingly, in the case where alignment of the liquid crystal molecules of the liquid crystal layer LC is controlled so that the curved display device displays a desired image, for example, a black image, the light that has passed through the liquid crystal layer LC does not pass through the second polarizing layer 230b, and thus a black image can be displayed without light leakage.

As described above, according to the curved display device of this embodiment of the present invention, since the first polarizing layer 120a is formed between the first substrate 110 and the liquid crystal layer LC and the second polarizing layer 230b is formed between the second substrate 210 and the liquid crystal layer LC, the light provided to the liquid crystal layer LC maintains the polarization characteristic imparted by first polarizing layer 120a even if the first substrate 110 exhibits optical anisotropy. Further, light that is provided from the liquid crystal layer LC can be polarized regardless of the optical anisotropy of the second substrate 210.

Accordingly, in the curved display device according to this embodiment of the present invention, the display of undesired image effects due to optical anisotropy of the second substrate 230, can be minimized.

Next, a curved display device according to still another embodiment of the present invention will be described.

Figure 17:
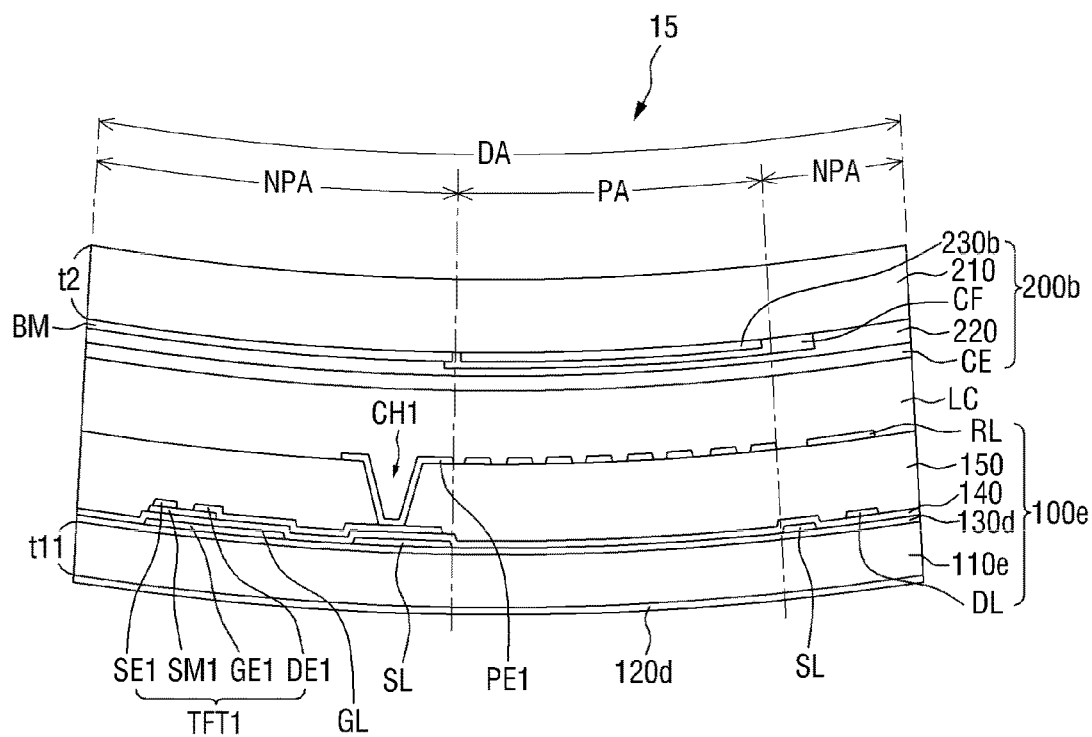
FIG. 17 is a cross-sectional view of yet another embodiment of a display panel that corresponds to the display panel of FIG. 5.

FIG. 17 is a cross-sectional view of a different embodiment of a display panel constructed according to FIG. 5.

Referring to FIG. 17, a curved display device according to this embodiment of the present invention has largely the same configuration as the configuration of the curved display device 50 of FIG. 2, except that display panel 15 is different from the display panel 10 of the curved display device 50. Accordingly, explanation of the curved display device according to this embodiment of the present invention will focus on the display panel 15.

The display panel 15 may include a first display plate 100e and a second display plate 200b that face each other. The first display plate 100e and the second display plate 200b may be bonded together by a sealant (not illustrated) as is known. A liquid crystal layer LC may be interposed between the first display plate 100e and the second display plate 200b.

The display panel 15 is similar to the first display plate 100d of FIG. 14, and includes a first substrate 110e, a first polarizing layer 120d, a first insulating layer 130d, a gate line GL, a data line DL, a storage line SL, a reference line RL, a gate insulating layer 140, a first thin film transistor TFT1, a second thin film transistor TFT2, a third thin film transistor TFT3, a protection layer 150, and a first electrode PE.

However, the first substrate 110e has a first thickness t11 that is thinner than the first thickness t1 of the first substrate 110e of FIG. 14. That is, the first thickness t11 of the first substrate 110e may be thinner than the second thickness t2 of the second substrate 210. In this case, the first stress that occurs on the first substrate 110e due to fastening of the flat display panel 15 to the curved backlight unit 20 may be lower than the second stress that occurs on the second substrate 210.

Due to this, the amount of optical anisotropy of the first substrate 110e can be reduced. Accordingly, even if the first polarizing layer 120d is arranged outside the first substrate 110e, phase retardation in the light that is polarized by the first polarizing plate 120d may not be significant even though the light subsequently passes through optically anisotropic substrate 110e.

Since the second display plate 200b of the display panel 15 has been described in detail, duplicate explanation thereof will be omitted.

As described above, according to the curved display device of this embodiment of the present invention, the first stress that is generated in the first substrate 110e may be lower than the second stress in the second substrate 210 by making the first thickness t11 of the first substrate 110e thinner than the second thickness t2 of the second substrate 210.

Accordingly, in the curved display device according to this embodiment of the present invention, light provided to the liquid crystal layer has reduced phase retardation, due to the reduced optical anisotropy of the first substrate 110e, allowing for a slim curved display device to be more effectively implemented.

Next, a curved display device according to still another embodiment of the present invention will be described.

Figure 18:
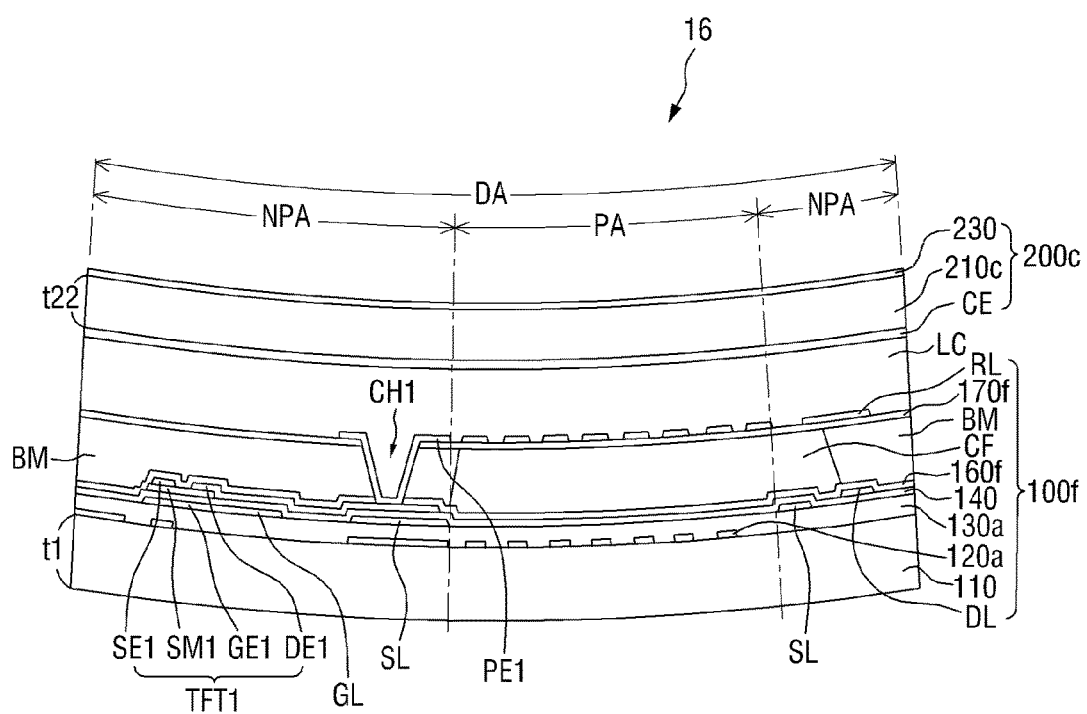
FIG. 18 is a cross-sectional view of a still further embodiment of a display panel that corresponds to the display panel of FIG. 5.

FIG. 18 is a cross-sectional view of a different embodiment of a display panel constructed according to FIG. 5.

Referring to FIG. 18, a curved display device according to this embodiment of the present invention has largely the same configuration as the configuration of the curved display device 50 of FIG. 2, except that display panel 16 is different from the display panel 10 of the curved display device 50. Accordingly, explanation of the curved display device of this embodiment of the present invention will focus on the display panel 16.

The display panel 16 may include a first display plate 100f and a second display plate 200c that face each other. The first display plate 100f and the second display plate 200c may be bonded together by a sealant (not illustrated) in known manner. A liquid crystal layer LC may be interposed between the first display plate 100f and the second display plate 200c.

The display panel 16 is similar to the first display plate 100a of FIG. 8, and includes a first substrate 100, a first polarizing layer 120a, a first insulating layer 130a, a gate line GL, a data line DL, a storage line SL, a reference line RL, a gate insulating layer 140, a first thin film transistor TFT1, a second thin film transistor TFT2, a third thin film transistor TFT3, a second insulating layer 160f, a black matrix BM, a color filter CF, a planarization layer 170f, and a first electrode PE.

In this embodiment, the second insulating layer 160f is formed on the first thin film transistor TFT1, the second thin film transistor TFT2, and the third thin film transistor TFT3. The black matrix BM and the color filter CF included in the second display plate 200 of FIG. 8 are instead formed on the second insulating layer 160f of the first display plate 100f. The planarization layer 170f is also formed on the first display plate 100f for planarization of the black matrix BM and the color filter CF. In this case, the black matrix BM may overlap the gate line GL, the data line DL, and the thin film transistors TFT1, TFT2, and TFT3.

The second display plate 200c of the display panel 16 is similar to the second display plate 200 of FIG. 8, and includes a second substrate 210c, a second polarizing layer 230, and a second electrode CE.

The second display plate 200c is thinner than the second display plate 200 of FIG. 8, as the second substrate 210c may be formed with a second thickness t22 that is thinner than the first thickness t1. In this case, the second stress that occurs in the second substrate 210c due to fastening of the flat display panel 16 to the curved backlight unit 20 may be lower than the first stress that occurs on the first substrate 110.

Due to this, the amount of optical anisotropy occurring in the second substrate 210c can be reduced. Accordingly, even if the second polarizing layer 230 is arranged outside the second substrate 210c, phase retardation in the light that passes through the second substrate 210c may not be significant.

As described above, according to the curved display device according to this embodiment of the present invention, the second stress that is generated in the second substrate 210c can be made to be lower than the first stress in the first substrate 110 by making the second thickness t22 of the second substrate 210c thinner than the first thickness t1 of the first substrate 110.

Accordingly, in the curved display device according to this embodiment of the present invention, the light provided to the second polarizing layer 230 has reduced phase retardation due to the reduced optical anisotropy of the second substrate 210c. Thus, a slim curved display device can be more advantageously implemented.

Those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. Any and all features of the various embodiments, disclosed or otherwise, may be mixed and matched in any manner, so as to create further embodiments also encompassed by the invention.

What is claimed is:
1. A curved display device comprising:
  a first substrate having a first uniform thickness and a second substrate having a second uniform thickness thicker than the first thickness, the first substrate and the second substrate facing each other and having a curvature;
  a liquid crystal layer arranged between the first substrate and the second substrate;
  a first polarizing layer positioned to face a second surface of the first substrate, the second surface of the first substrate being opposite to a first surface of the first substrate, wherein the first surface of the first substrate faces the liquid crystal layer; and
  a second polarizing layer arranged between the liquid crystal layer and a first surface of the second substrate that faces the liquid crystal layer.
2. The curved display device of claim 1, wherein the first polarizing layer comes in direct contact with the first substrate.

3. The curved display device of claim 1, further comprising thin film transistors arranged between the first polarizing layer and the liquid crystal layer.

4. The curved display device of claim 1, wherein the second polarizing layer comes in direct contact with the second substrate.

5. The curved display device of claim 1, wherein the first polarizing layer is formed to have a first optical axis, and the second polarizing layer is formed to have a second optical axis that is substantially perpendicular to the first optical axis.

6. The curved display device of claim 1, further comprising a backlight unit arranged on a lower portion of the first substrate to supply light.

7. The curved display device of claim 1, wherein the first substrate comprises a display area in which an image is to be displayed and in which a plurality of pixels are defined, as well as a non-display area positioned proximate to least one side of the display area.

8. The curved display device of claim 7, wherein the first polarizing layer is an absorption type polarizing layer, and the second polarizing layer is an absorption type polarizing layer, and
the first polarizing layer and the second polarizing layer are arranged over substantially an entire surface of the first substrate or arranged to overlap at least the display area of the first substrate.

9. The curved display device of claim 7, further comprising a first electrode arranged in a pixel of the first substrate and arranged between the first polarizing layer and the liquid crystal layer,
wherein the first polarizing layer is a reflection type polarizing layer, and the second polarizing layer is an absorption type polarizing layer, and
the first polarizing layer includes a plurality of metal lines which are arranged over substantially the entire first substrate, arranged to overlap the display area of the first substrate, or arranged to overlap the first electrode of the first substrate.

10. The curved display device of claim 7, further comprising a first electrode arranged in a pixel of the first substrate and arranged between the first polarizing layer and the liquid crystal layer,
wherein the first polarizing layer is an absorption type polarizing layer, and the second polarizing layer is a reflection type polarizing layer, and
the second polarizing layer includes a plurality of metal lines which are arranged on the second substrate to overlap the first electrode.

11. The curved display device of claim 10, further comprising:
thin film transistors arranged between the first polarizing layer and the first electrode; and
a black matrix arranged on the second substrate so as to overlap the thin film transistors,
wherein the first electrode includes a first sub-electrode and a second sub-electrode arranged so that the thin film transistors are interposed between the first sub-electrode and the second sub-electrode, and
the second polarizing layer is positioned at a same level as the level of the black matrix.

12. The curved display device of claim 7, further comprising a first electrode arranged in a pixel of the first substrate and arranged between the first polarizing layer and the liquid crystal layer,
wherein the first polarizing layer is a reflection type polarizing layer, and the second polarizing layer is a reflection type polarizing layer,
the first polarizing layer includes a plurality of metal lines which are arranged over substantially the entire first substrate, arranged to overlap the display area on the first substrate, or arranged to overlap the first electrode on the first substrate, and
the second polarizing layer includes a plurality of metal lines arranged to overlap the first electrode.

13. The curved display device of claim 1, wherein the curved display device further comprises a pixel region and a non-pixel region which is not the pixel region, and
wherein the second polarizing layer is positioned not in the non-pixel region but in the pixel region.

* * * * *